US011013323B2

(12) United States Patent
Boone

(10) Patent No.: US 11,013,323 B2
(45) Date of Patent: May 25, 2021

(54) FRAMED FULL ACCESS CABINET

(71) Applicant: DAVID O. BOONE REVOCABLE TRUST, Chesapeake, VA (US)

(72) Inventor: David Oliver Boone, Chesapeake, VA (US)

(73) Assignee: David O. Boone Revocable Trust, Chesapeake, VA (US)

( * ) Notice: Subject to any disclaimer, the term of this patent is extended or adjusted under 35 U.S.C. 154(b) by 0 days.

(21) Appl. No.: 16/928,960

(22) Filed: Jul. 14, 2020

(65) Prior Publication Data
US 2020/0337458 A1    Oct. 29, 2020

Related U.S. Application Data

(60) Division of application No. 15/956,156, filed on Apr. 18, 2018, now Pat. No. 10,722,029, and a
(Continued)

(51) Int. Cl.
*A47B 47/00* (2006.01)
*A47B 88/95* (2017.01)
(Continued)

(52) U.S. Cl.
CPC ............ *A47B 88/95* (2017.01); *A47B 47/042* (2013.01); *A47B 57/585* (2013.01); *A47B 88/43* (2017.01); *A47B 88/941* (2017.01); *F16B 12/22* (2013.01); *F16B 12/24* (2013.01); *F16B 12/46* (2013.01); *A47B 2088/4235* (2017.01); *A47B 2230/0033* (2013.01)

(58) Field of Classification Search
CPC ..... A47B 47/042; A47B 57/585; A47B 88/43; A47B 88/95; A47B 88/941; F16B 12/22; F16B 12/24; F16B 12/46
USPC ............ 312/257.1, 265.1, 265.5, 263, 330.1, 312/334.7, 111
See application file for complete search history.

(56) References Cited

U.S. PATENT DOCUMENTS

| 232,772 | A | * | 9/1880 | Spier | |
| 1,350,155 | A | * | 8/1920 | Hellweg | F16B 12/58 5/300 |

(Continued)

FOREIGN PATENT DOCUMENTS

| DE | 19621986 | * | 10/1997 |
| EP | 3141767 | * | 3/2017 |

(Continued)

*Primary Examiner* — James O Hansen
(74) *Attorney, Agent, or Firm* — Olav M. Underdal; IDP Patent Services

(57) ABSTRACT

A full access frame can be designed with a thin frame with stiles that are about half the width of conventional stiles, such that inner sides of the stiles and rails include hidden/blind connection points to facilitate hidden or blind mounting of the full access frame to cabinet sides with mounted dowel connectors that attach to the hidden/blind connection points. A framed full access cabinet includes a full access frame mounted on front of a cabinet box, such that drawer rails and door hinges can be mounted on inner cabinet sides of the cabinet box. The dowel connectors and the hidden/blind connection points can be respectively slide-in dowels and slide-in inserts or alternatively snap-in dowels and snap-in inserts.

20 Claims, 24 Drawing Sheets

Related U.S. Application Data continuation-in-part of application No. 15/955,269, filed on Apr. 17, 2018, said application No. 15/956,156 is a continuation-in-part of application No. 15/955,201, filed on Apr. 17, 2018.

(60) Provisional application No. 62/511,733, filed on May 26, 2017, provisional application No. 62/504,765, filed on May 11, 2017, provisional application No. 62/488,007, filed on Apr. 20, 2017, provisional application No. 62/488,004, filed on Apr. 20, 2017.

(51) Int. Cl.
| | | |
|---|---|---|
| *A47B 88/90* | (2017.01) | |
| *A47B 88/43* | (2017.01) | |
| *A47B 57/58* | (2006.01) | |
| *A47B 47/04* | (2006.01) | |
| *F16B 12/24* | (2006.01) | |
| *F16B 12/22* | (2006.01) | |
| *F16B 12/46* | (2006.01) | |
| *A47B 88/423* | (2017.01) | |

(56) References Cited

U.S. PATENT DOCUMENTS

| | | | | |
|---|---|---|---|---|
| 1,763,306 | A * | 6/1930 | Hendrickson | A47B 77/08 312/107 |
| 2,197,976 | A * | 4/1940 | Fletcher | G09B 1/10 446/1 |
| 2,214,939 | A * | 9/1940 | Stirn | F16B 19/02 403/276 |
| 2,639,739 | A * | 5/1953 | Johnson | B27M 3/28 144/30 |
| 3,405,592 | A * | 10/1968 | Blodee | F16B 12/24 411/389 |
| 3,427,919 | A * | 2/1969 | Lerich | F16B 13/0891 411/39 |
| 3,713,718 | A * | 1/1973 | Lucci | A47B 47/04 312/263 |
| 3,784,271 | A * | 1/1974 | Schreiber | A47B 77/00 312/265.5 |
| 3,954,345 | A * | 5/1976 | Morris | F16B 12/24 403/297 |
| 3,966,339 | A * | 6/1976 | Nemecek | F16B 12/24 403/292 |
| 3,969,820 | A * | 7/1976 | Kulig | A61C 9/002 433/74 |
| 4,127,353 | A * | 11/1978 | Busse | F16B 12/2054 312/264 |
| 4,357,119 | A * | 11/1982 | Pollitt | F16B 12/26 403/231 |
| 4,384,746 | A * | 5/1983 | Ferdinand | A47B 88/493 312/334.7 |
| 4,564,306 | A * | 1/1986 | Rock | F16B 12/2036 403/14 |
| 4,681,477 | A * | 7/1987 | Fischer | F16B 12/04 206/219 |
| 4,923,321 | A * | 5/1990 | Kriz | A47B 88/00 403/6 |
| 4,963,051 | A * | 10/1990 | Hutter | F16B 2/18 403/298 |
| 5,308,205 | A * | 5/1994 | Lautenschlager | F16B 13/02 411/182 |
| 5,468,109 | A * | 11/1995 | Ferrari | F16B 12/24 411/553 |
| 5,479,877 | A * | 1/1996 | Demboske | A01K 31/14 119/428 |
| 5,611,637 | A * | 3/1997 | Brustle | A47B 88/00 403/297 |
| 5,979,017 | A * | 11/1999 | Karl | E05D 5/08 16/382 |
| 6,106,185 | A * | 8/2000 | Isele | A47B 88/43 312/334.5 |
| 6,276,868 | B1 * | 8/2001 | Vallance | F16B 12/2009 403/231 |
| 6,287,044 | B1 * | 9/2001 | Huber | F16B 12/14 403/297 |
| 6,464,441 | B2 * | 10/2002 | Kupper | F16B 12/24 411/383 |
| 6,547,477 | B1 * | 4/2003 | Huber | F16B 12/2009 403/231 |
| 7,451,535 | B2 * | 11/2008 | Wells | A47B 47/042 29/412 |
| 7,926,891 | B2 * | 4/2011 | Ritter | A47B 88/463 312/319.5 |
| 8,092,112 | B2 * | 1/2012 | Borgman | F16B 12/2027 403/231 |
| 9,016,975 | B2 * | 4/2015 | Raich | F16B 12/20 403/322.4 |
| 2006/0113031 | A1 * | 6/2006 | Langtry | E21D 20/02 156/293 |
| 2013/0257243 | A1 * | 10/2013 | Bader | A47B 47/042 312/265.2 |
| 2015/0147113 | A1 * | 5/2015 | Crabtree, II | F16B 12/22 403/292 |
| 2017/0023043 | A1 * | 1/2017 | Koelling | F16B 12/22 |
| 2017/0037891 | A1 * | 2/2017 | Giovannetti | F16B 12/2027 |
| 2017/0175789 | A1 * | 6/2017 | Matzler | F16B 13/06 |
| 2018/0017091 | A1 * | 1/2018 | Schon | F16B 12/22 |

FOREIGN PATENT DOCUMENTS

| | | | |
|---|---|---|---|
| FR | 2302439 | * | 9/1976 |
| KR | 20160021368 | * | 2/2016 |
| WO | 2012062618 | * | 5/2012 |
| WO | 2016071008 | * | 5/2016 |

* cited by examiner

Slide-In Fastening System

Slide-In Dowel

Insert Aperture

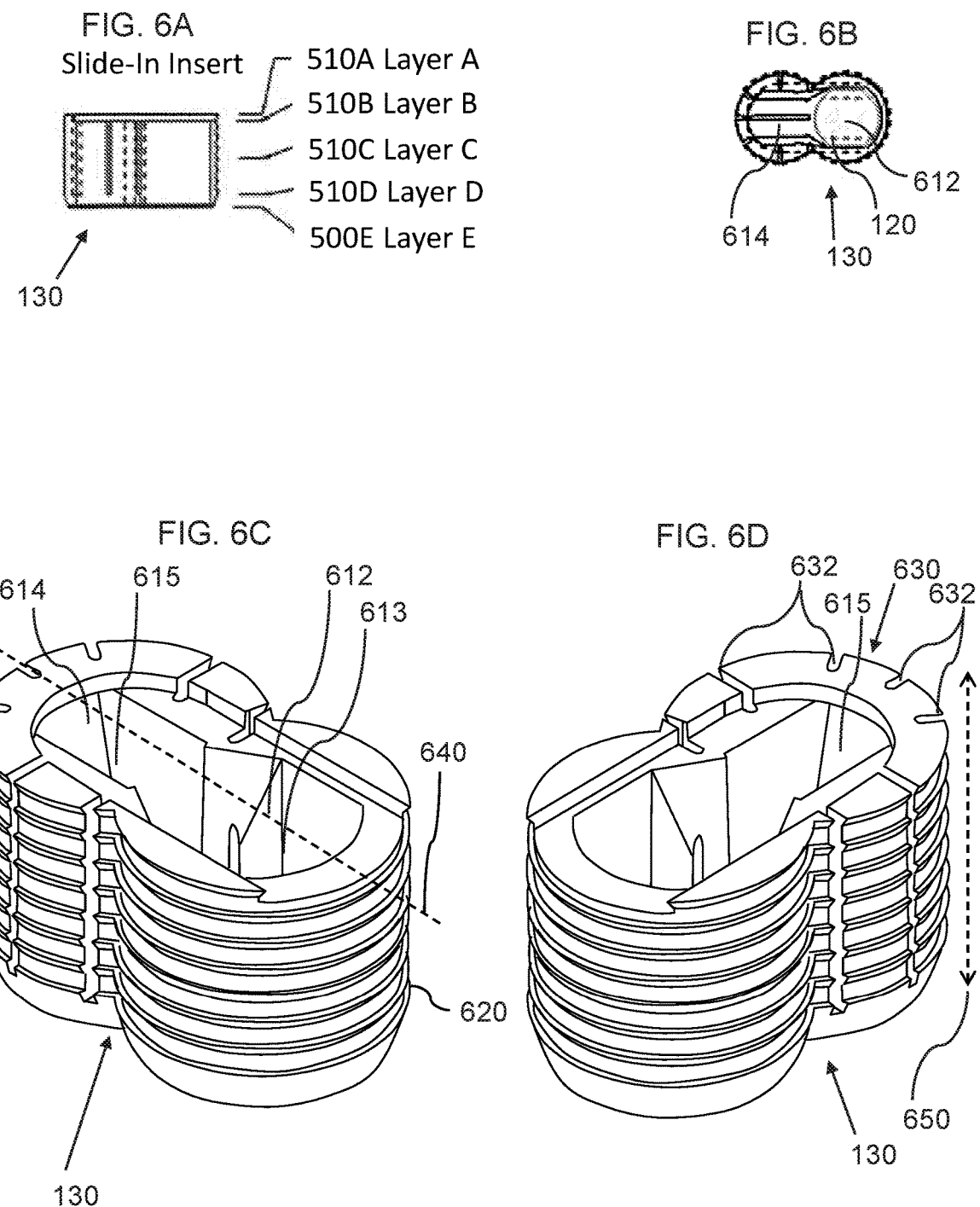

510A
Layer A

130

510B
Layer B

130

510C
Layer C

130

510D
Layer D

130

510E
Layer E 710    130

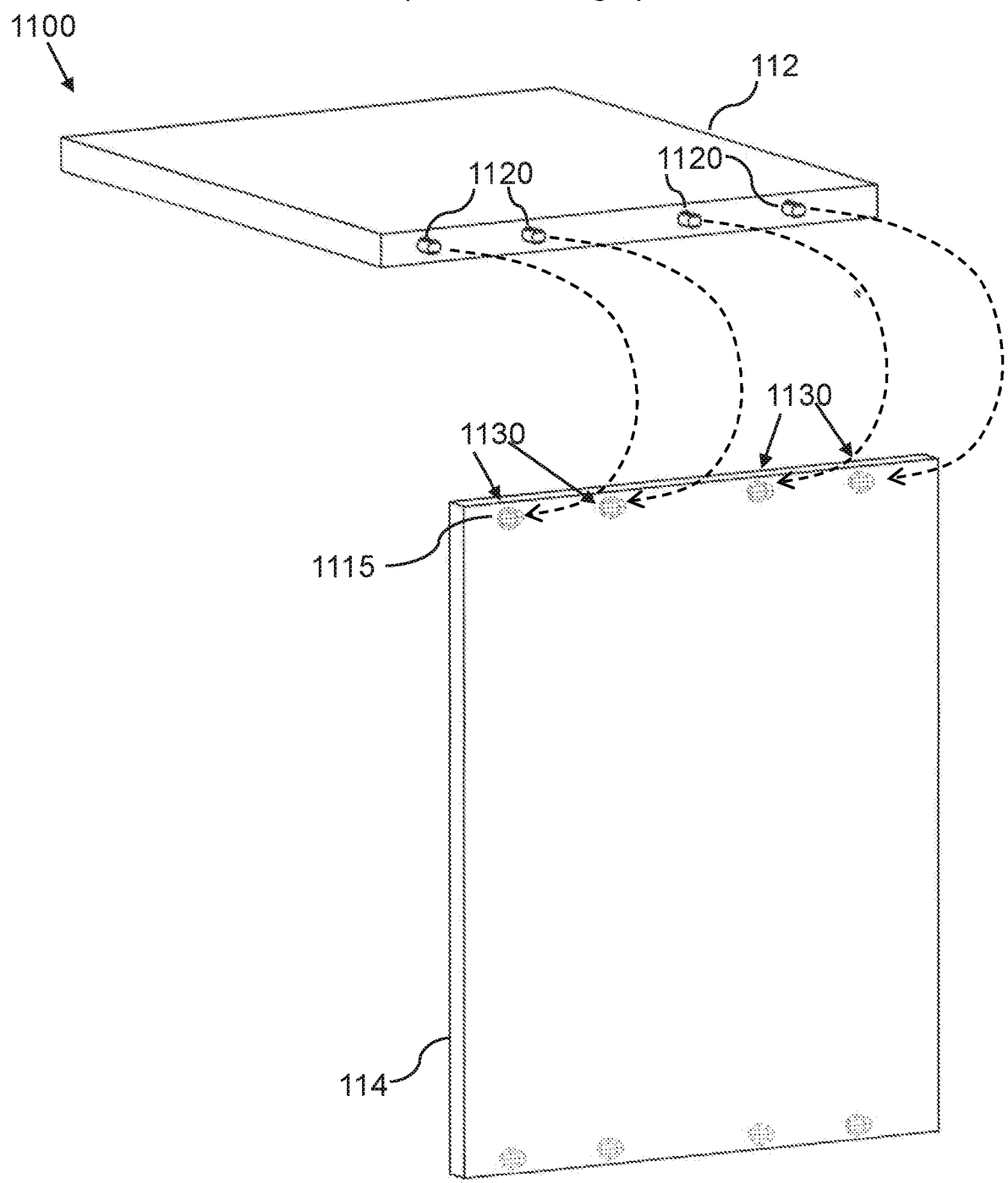

Snap-In Fastening System

Snap-in Dowel

Insert Aperture

Insert Aperture

Snap-In Insert

1510A
Top Cross Section

1510B
Entry Cross Section

1510C
Middle Cross Section

1510D
Bottom Cross Section

FIG. 21C
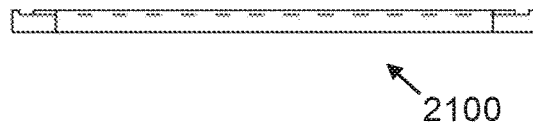
FIG. 21A
Conventional Cabinet Frame
FIG. 21B
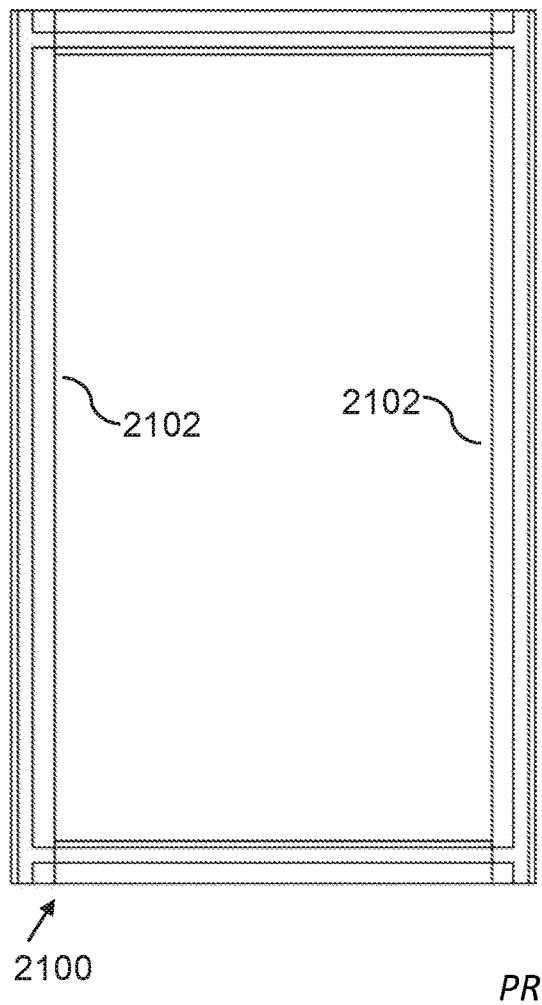
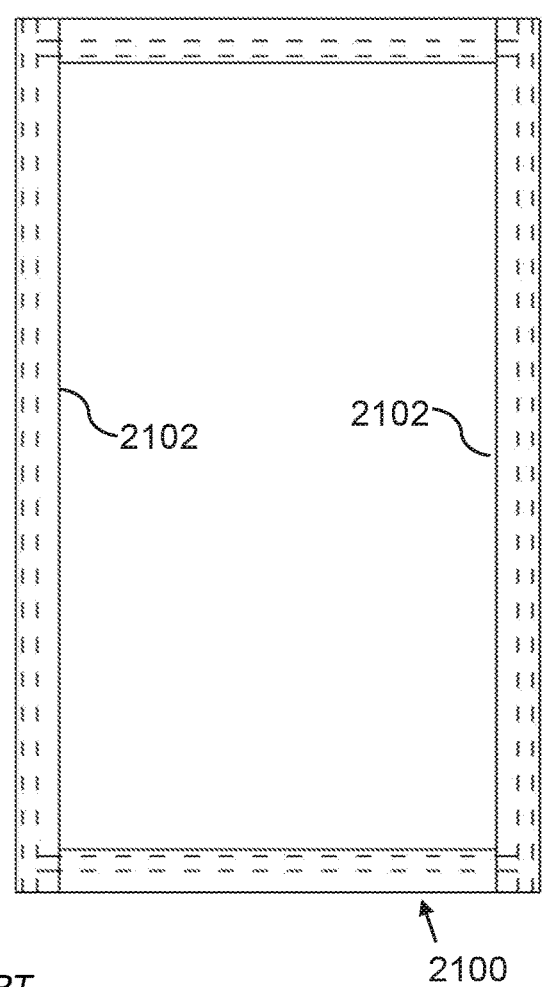
PRIOR ART Conventional Cabinet Frame Mounting

PRIOR ART

FIG. 23A
Full Access Frame
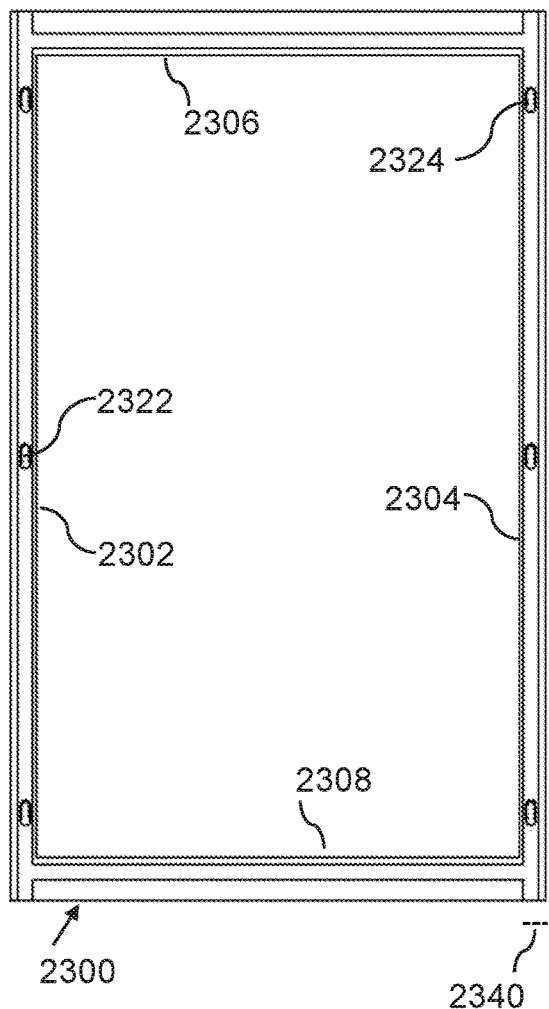
FIG. 23B
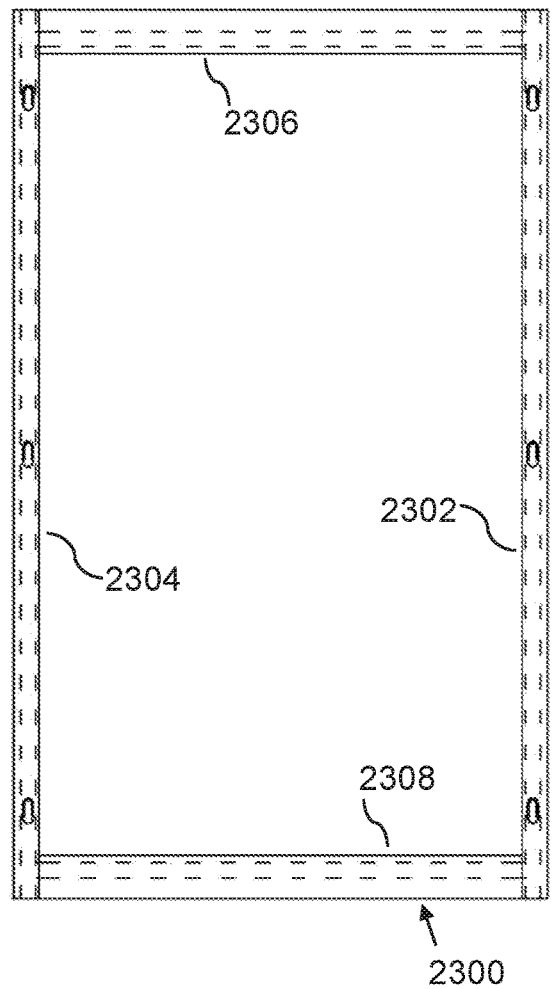

Dowel Connect Frame and Side

Framed Full Access Cabinet

FRAMED FULL ACCESS CABINET

CROSS-REFERENCE TO RELATED APPLICATIONS

This U.S. Non-Provisional application is a Division of U.S. Non-Provisional application Ser. No. 15/956,156, filed Apr. 18, 2018; which claims the benefit of U.S. Provisional Application No. 62/511,733, filed May 26, 2017; and claims the benefit of U.S. Provisional Application 62/504,765, filed May 11, 2017; and is a continuation-in-part of U.S. Non-Provisional application Ser. No. 15/955,269, filed Apr. 17, 2018, which claims the benefit of U.S. Provisional Application 62/488,007, filed Apr. 20, 2017; and is a continuation-in-part of U.S. Non-Provisional application Ser. No. 15/955,201, filed Apr. 17, 2018, which claims the benefit of U.S. Provisional Application 62/488,004, filed Apr. 20, 2017; all of which are hereby incorporated herein by reference in their entirety.

FIELD OF THE INVENTION

The present invention relates generally to the field of cabinet and furniture construction, and more particularly to cabinet frame designs and associated fastening devices, methods and systems for use in cabinet and furniture assembly.

BACKGROUND OF THE INVENTION

Traditionally, some cabinets are assembled using dowels and glue, in a time consuming and expensive process that is not suitable for do-it-yourself users. Other modern manufacturing methods rely on cam connectors that, although simple in use, do not produce a stable fastening function, and generally will loosen significantly after shipping, disassembly and reassembly. Other modern connectors may function well, but are complex and time consuming to manufacture.

A traditional American cabinet has an applied frame onto which hinges, drawer slides and accessories are attached. The frame comprises of vertical stiles and horizontal rails. The current American industry standard is to utilize 1½" or wider stiles and rails. An advantage of the traditional American construction is ease of installation, because the frame adds rigidity to compensate for building walls that are not flat, plump, or straight. A disadvantage is a reduced functional opening, which particularly reduces the width of drawer boxes.

Frameless cabinets, sometimes referred to as European-style or full-access cabinets, are made without a frame, such that the front edge of the cabinet sides form the front of the cabinet. The side is made from a sheet good, typically plywood or particle boards, and the exposed front edge of the sheet good is edge banded with PVC or wood veneer. Hinges, drawer slides and accessories are attached to the sides. The main advantages of European-style cabinets are reduced cost and an increased access opening, which allows wider drawers and more storage space. However, due to the lack of a frame causing a lack of rigidity, European-style cabinets can be difficult to install properly on building walls that are not flat, plump, or straight.

As such, considering the foregoing, it may be appreciated that there continues to be a need for novel and improved devices and methods for construction of cabinets.

SUMMARY OF THE INVENTION

The foregoing needs are met, to a great extent, by the present invention, wherein in aspects of this invention, enhancements are provided to the existing model of systems and devices for construction of cabinets.

In an aspect, a full access frame can be designed with a relatively thin frame, with stiles that are in a range of ¾"-⅞", about half the width of conventional stiles, such that inner sides of the stiles and rails include hidden/blind connection points to facilitate hidden or blind mounting of the full access frame to cabinet sides with mounted dowel connectors that attach to the hidden/blind connection points.

In related aspects, a framed full access cabinet includes a full access frame mounted on front of a cabinet box, such that drawer rails and door hinges can be mounted on inner cabinet sides of the cabinet box.

In a further related aspect, the dowel connectors and the hidden/blind connection points can be respectively slide-in dowels and slide-in inserts.

In another further related aspect, the dowel connectors and the hidden/blind connection points can be respectively snap-in dowels and snap-in inserts.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. In addition, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 6A is a side view of a slide-in insert of the slide-in fastening system, according to an embodiment of the invention.

FIG. 6B is a front view of a slide-in insert of the slide-in fastening system, according to an embodiment of the invention.

FIG. 6C is a perspective view of a slide-in insert of the slide-in fastening system, according to an embodiment of the invention.

FIG. 6D is a perspective view of a slide-in insert of the slide-in fastening system, according to an embodiment of the invention.

FIG. 11 is a perspective view of a snap-in fastening system prior to assembly, according to an embodiment of the invention.

FIG. 21A is a rear view of a conventional American cabinet frame, according to an embodiment of the invention.

FIG. 21B is a front view of a conventional American cabinet frame, according to an embodiment of the invention.

FIG. 21C is a top view of a conventional American cabinet frame, according to an embodiment of the invention.

FIG. 23A is a rear view of a full access cabinet frame, according to an embodiment of the invention.

FIG. 23B is a front view of a full access cabinet frame, according to an embodiment of the invention.

FIG. 23C is a top view of a full access cabinet frame, according to an embodiment of the invention.

DETAILED DESCRIPTION

Figure 1:
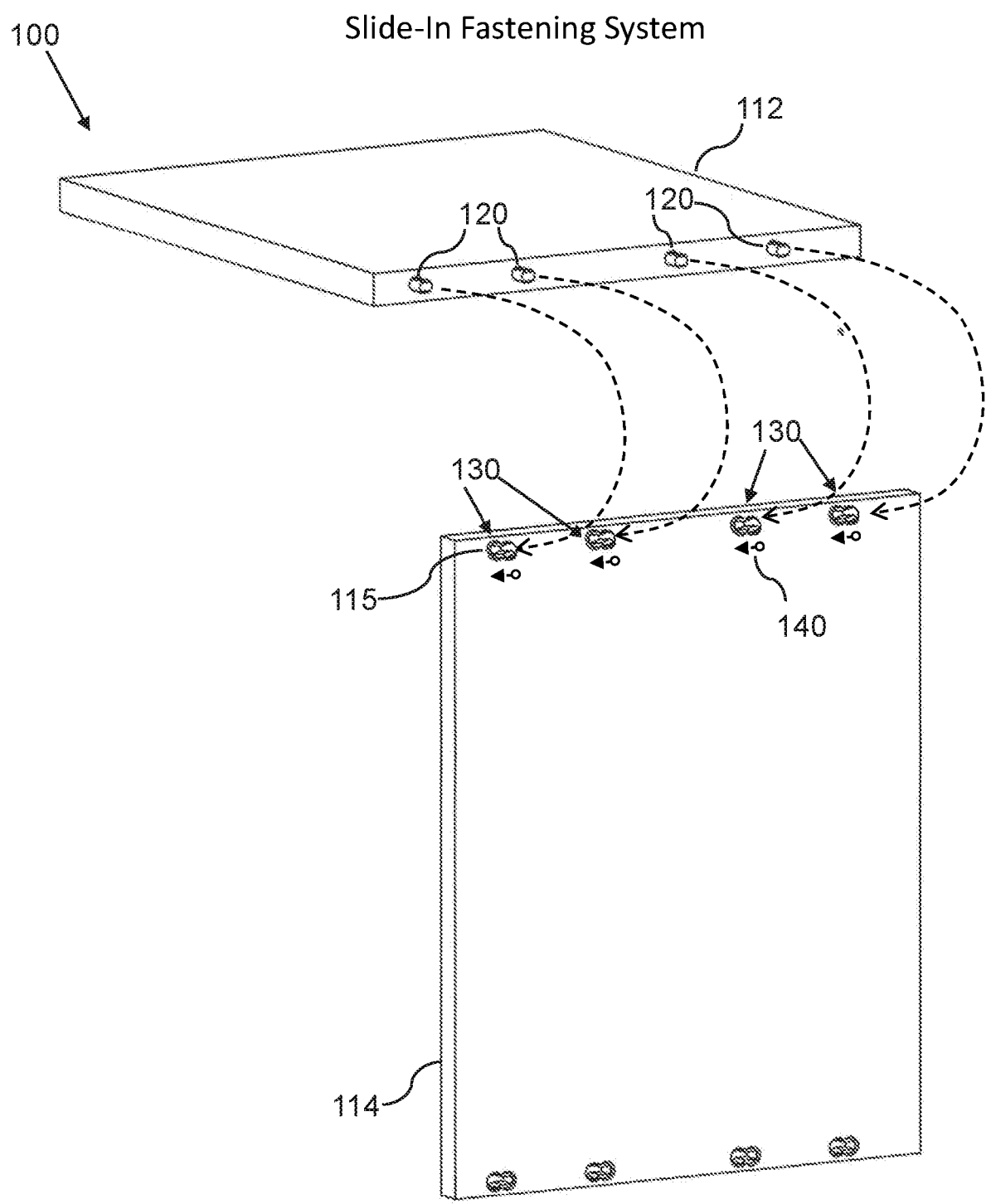
FIG. 1 is a perspective view of a slide-in fastening system prior to assembly, according to an embodiment of the invention.

Before describing the invention in detail, it should be observed that the present invention resides primarily in a novel and non-obvious combination of elements and process steps. So as not to obscure the disclosure with details that will readily be apparent to those skilled in the art, certain conventional elements and steps have been presented with lesser detail, while the drawings and specification describe in greater detail other elements and steps pertinent to understanding the invention.

The following embodiments are not intended to define limits as to the structure or method of the invention, but only to provide exemplary constructions. The embodiments are permissive rather than mandatory and illustrative rather than exhaustive.

In the following, we describe the structure of an embodiment of a framed full access cabinet 2500 with reference to FIG. 25, in such manner that like reference numerals refer to like components throughout; a convention that we shall employ for the remainder of this specification.

Figure 22:
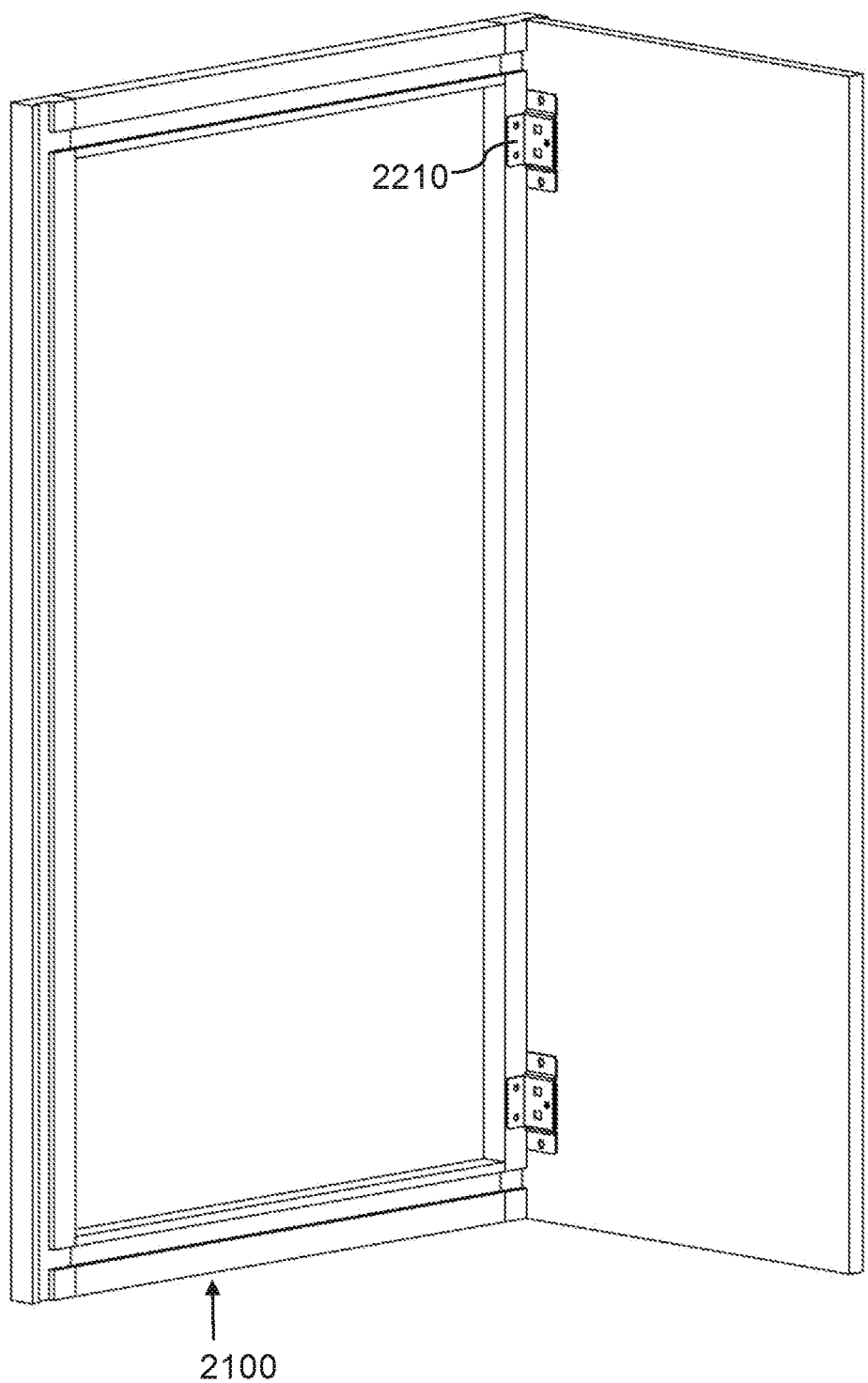
FIG. 22 is an inside perspective view of a conventional American cabinet frame including a door attached with hinges, according to an embodiment of the invention.

FIGS. 21A, 21B, and 21C shows a conventional cabinet frame 2100, as traditionally used in American cabinet making. Conventional cabinets 2100 have relatively thick frames, normally with 1½"-1¾" width stiles 2102, which due to their width limit access to the cabinet interior and reduce the widths of drawers that are mounted to the cabinet. All fittings 2210 are mounted on either the conventional cabinet frame 2100, such as shown in FIG. 22, and/or on the back of the cabinet (for drawer rails). Hinges and slides are mounted to inside edges of the stiles 2102.

European-style frameless cabinets instead mount fittings only on inner sides of cabinets. This provides added access but, due to the lack of a frame, European-style frameless cabinets suffer from lack of rigidity, which can make installation significantly more difficult, thus increasing installation cost, and also may limit longevity of installed cabinets.

Figure 24:
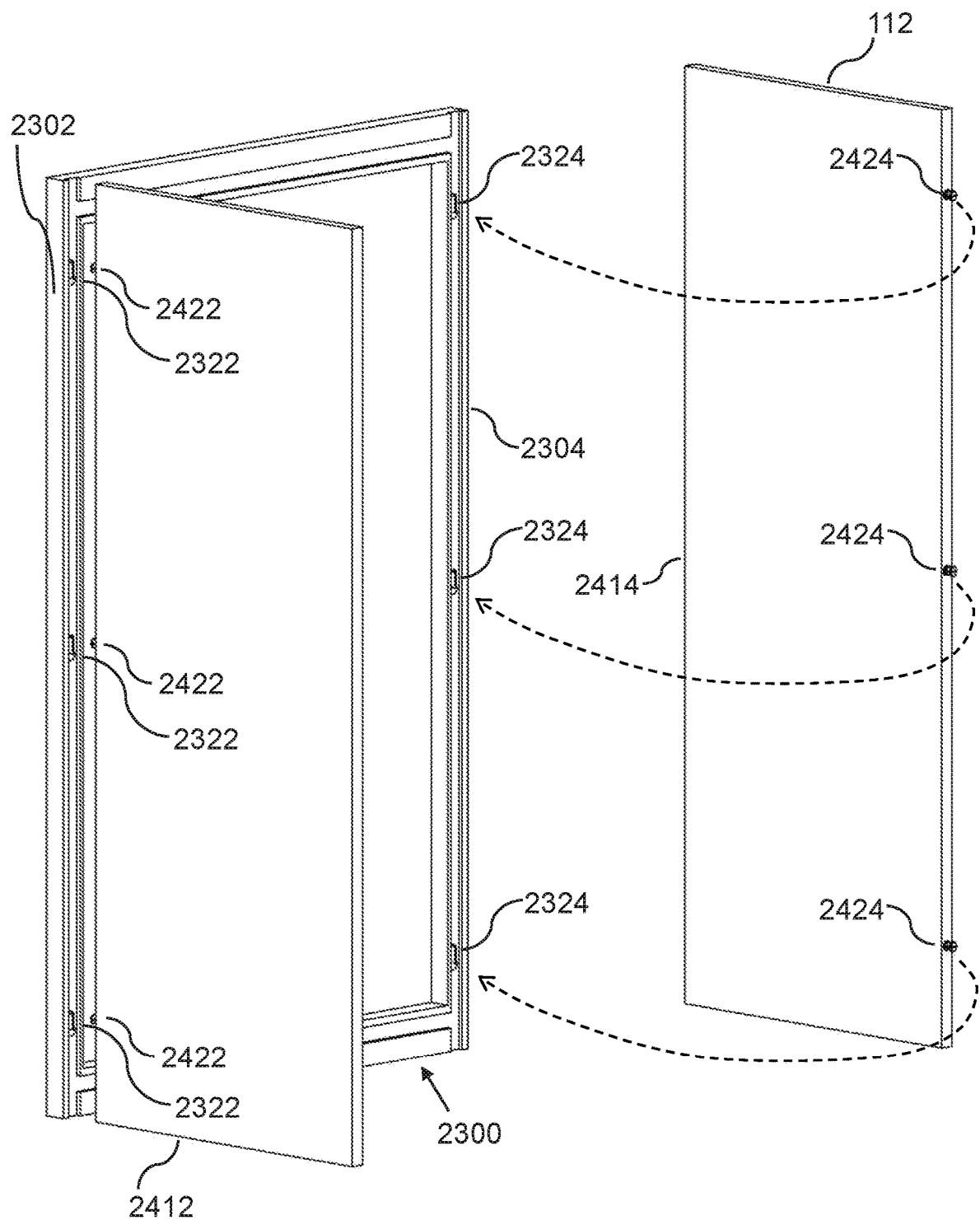
FIG. 24 is a perspective view of a full access cabinet frame with cabinet sides, according to an embodiment of the invention.

In an embodiment, as shown in FIGS. 23A, 23B, and 23C, a full access frame 2300 can be designed with a relatively thin frame, with stiles 2302 2304 that are in a range of ¾"-⅞", about half the width of conventional stiles, such that inner sides of the stiles 2302 2304 and rails, as shown in FIG. 23A, include hidden/blind connection points 2322 2324 to facilitate hidden or blind mounting of the full access frame 2300 to cabinet sides 112 with mounted dowel connectors 2422 2424 that attach to the hidden/blind connection points 2322 2324, as shown in FIG. 24.

Figure 25:
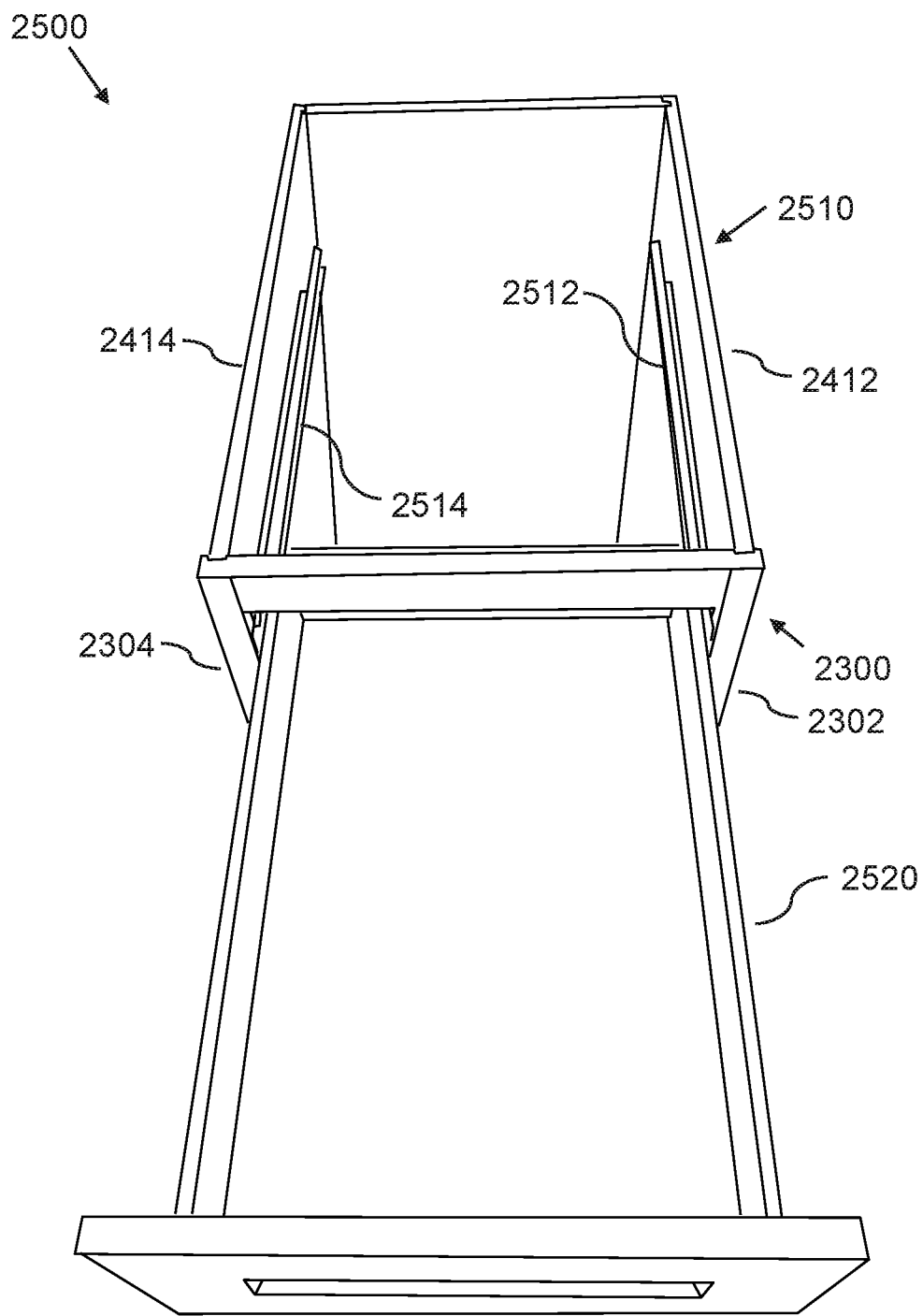
FIG. 25 is a top perspective view of a framed full access cabinet, according to an embodiment of the invention.
Figure 26:
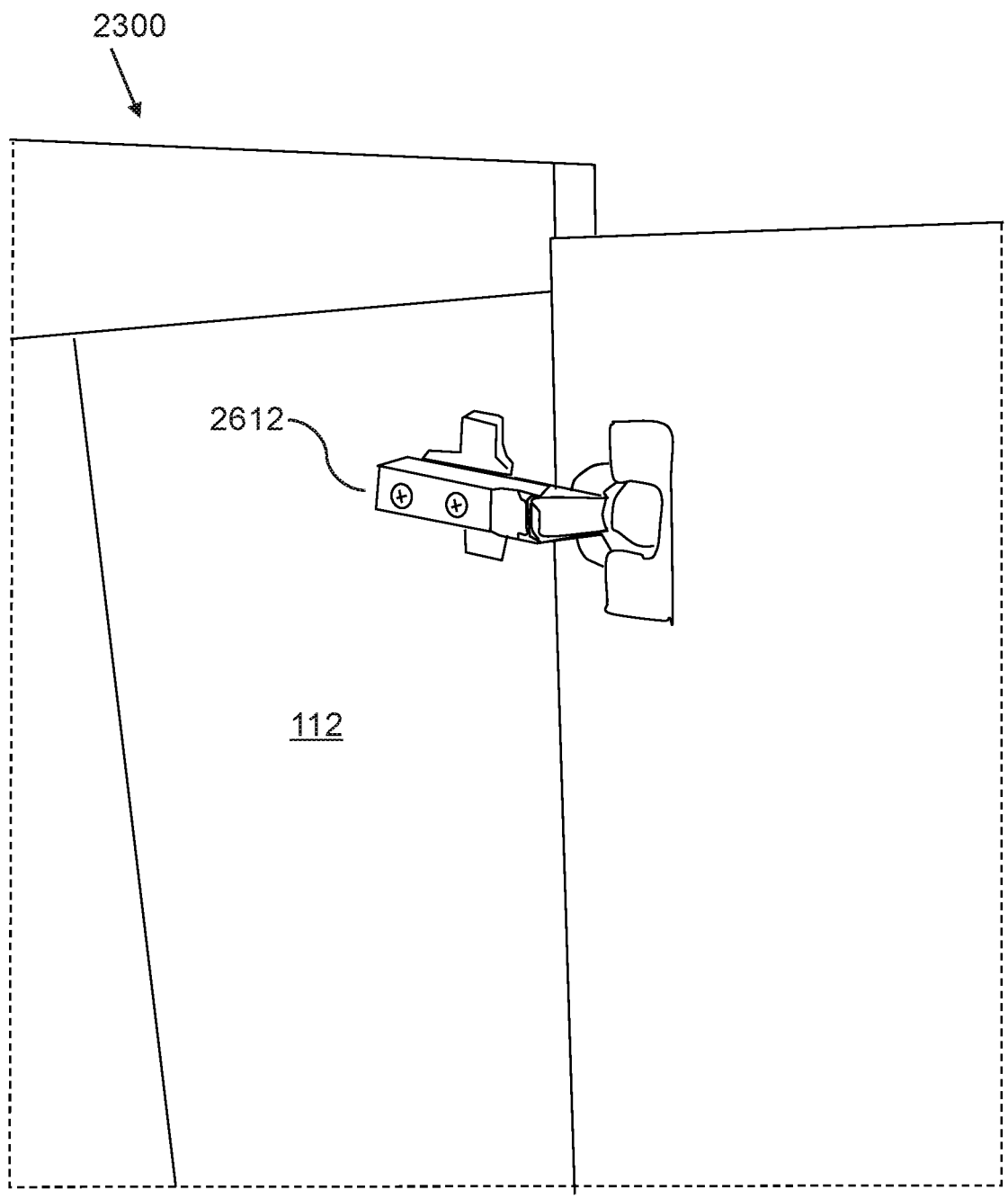
FIG. 26 is a perspective view of part of a framed full access cabinet, according to an embodiment of the invention.

In related embodiments, as shown in FIGS. 25 and 26, a framed full access cabinet 2500, includes a full access frame 2300 mounted on front of a cabinet box 2510. As shown, drawer rails 2512 2514 and hinges 2612 can be mounted on inner cabinet sides 112 of the cabinet box 2510.

Figure 2:
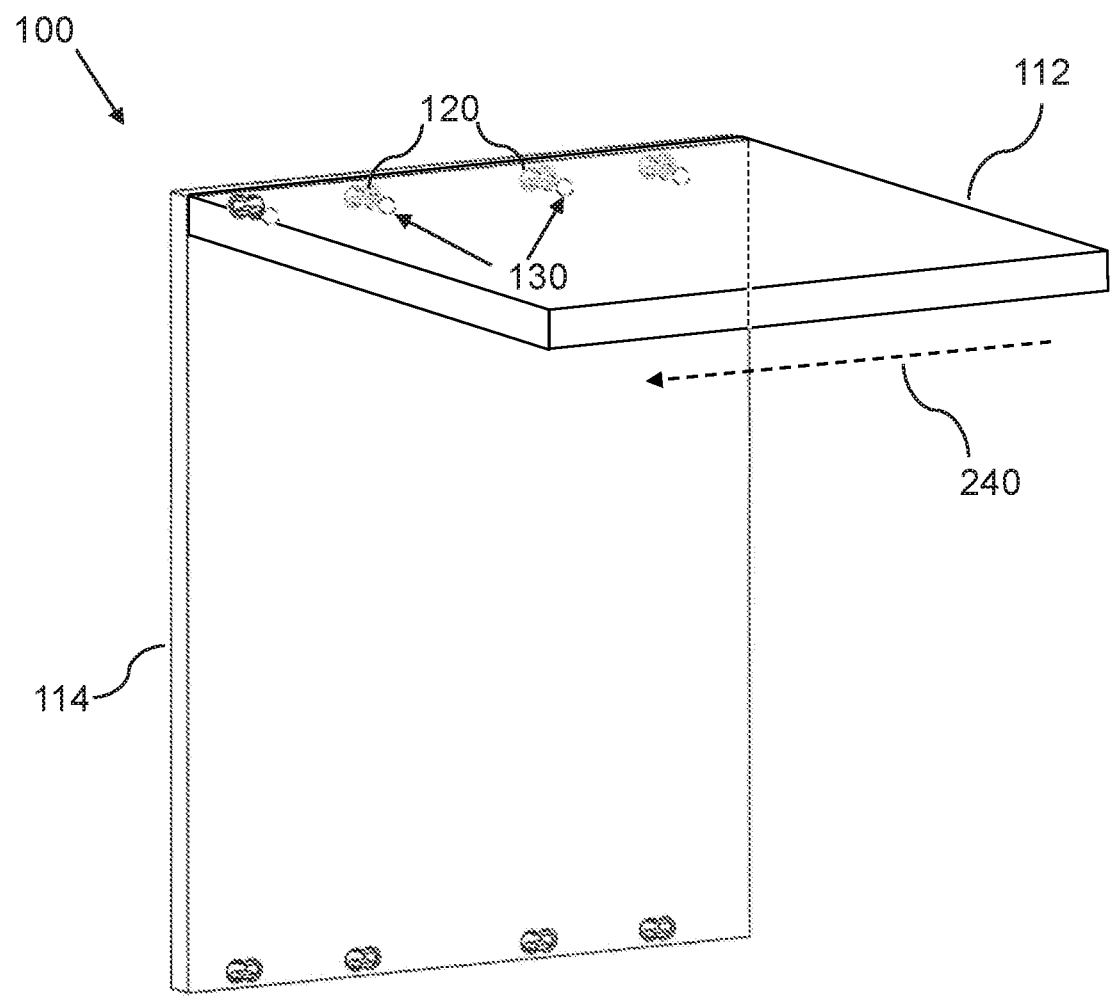
FIG. 2 is a perspective view of a slide-in fastening system after assembly, according to an embodiment of the invention.

In a further related embodiment, the dowel connectors 2422 2424 and the hidden/blind connection points 2322 2324 can be configured as respectively slide-in dowels 120 and slide-in inserts 130, as shown for example in connection points FIGS. 1 and 2.

Figure 12:
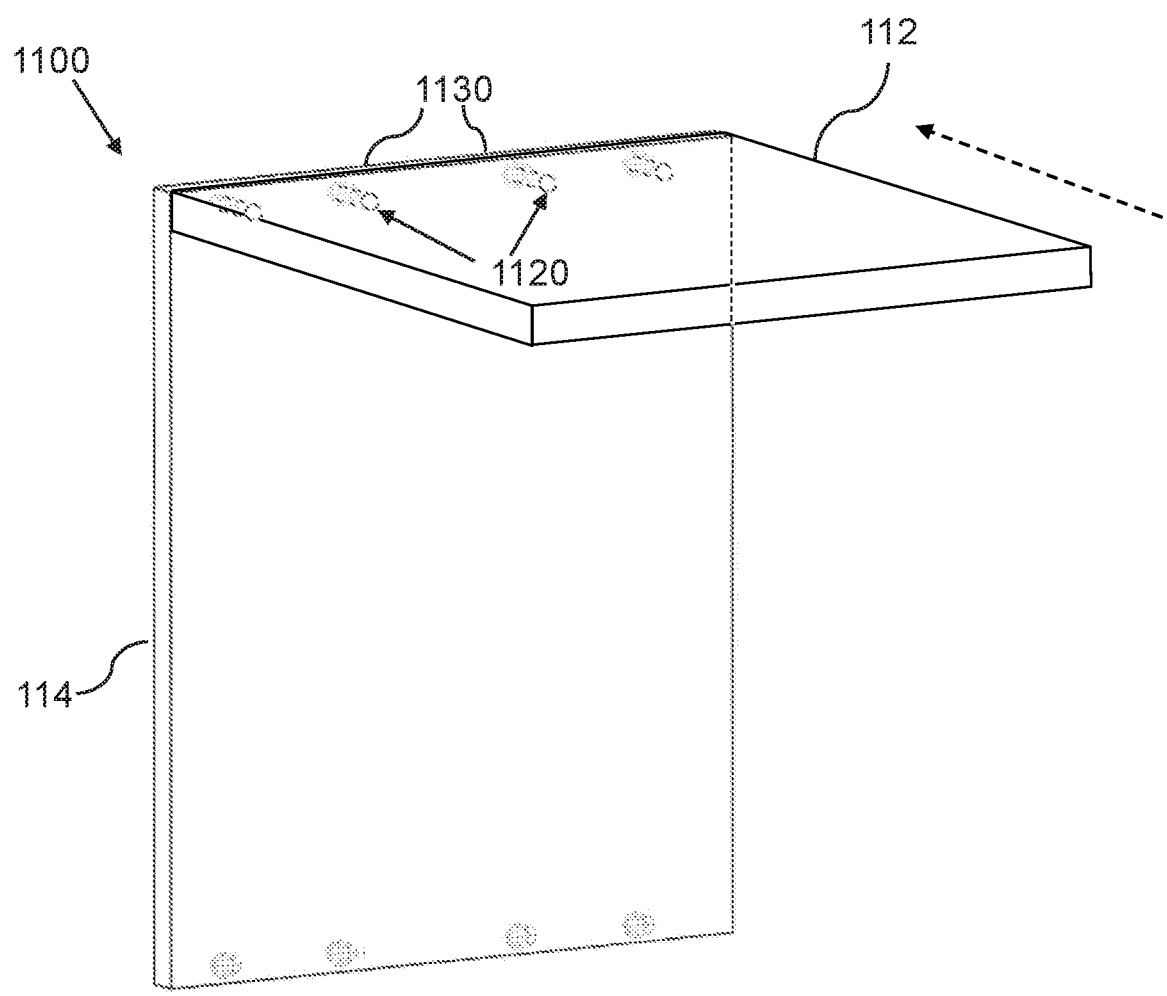
FIG. 12 is a perspective view of a snap-in fastening system after assembly, according to an embodiment of the invention.

In another further related embodiment, the dowel connectors 2422 2424 and the hidden/blind connection points 2322 2324 can be configured as respectively snap-in dowels 1120 and snap-in inserts 1130, as shown for example in FIGS. 11 and 12.

In various related embodiments, the framed full access cabinet 2500 allows a frame 2300 with very small stiles 2302 2304. Hinges 2612, drawer slides 2512, other hardware and accessories all attach to the sides 112. The frame attach points 2322 2324 are blind and invisible to the end consumer. Traditional American framed cabinets utilize visible stables, hotmelt glue, and visible frame-to-side attaching techniques that cannot be utilized with a flush or near flush interior side. The frame 2300 allows for the cabinet side thickness to be reduced, which costs less, but does not hinder the use of frameless hinges 2514, slides 2512 and accessories.

In an embodiment, as shown in FIG. 25, a full access cabinet 2500, can include:
a) a full access frame 2300, as shown in FIGS. 23A and 23B, including:
  a right stile 2302, including a plurality of right connection points 2322 positioned on an inner side of the right stile;
  a left stile 2304, including a plurality of left connection points positioned on an inner side of the left stile;
  a top rail 2306, which is horizontally connected between upper ends of the right and left stiles 2302 2304; and
  a bottom rail 2308, which is horizontally connected between lower ends of the right and left stiles 2302 2304; and
b) a right cabinet side 2412, as shown in FIG. 24, comprising a plurality of right dowel connectors 2422, which protrude from an outer end of the right cabinet side 2412; and
c) a left cabinet side 2414, as shown in FIG. 24, comprising a plurality of left dowel connectors 2424, which protrude from an outer end of the left cabinet side 2412;
wherein the right dowel connectors 2422 are attached to the right connection points 2322, such that the right cabinet side 2412 is attached to the inner/rear side of the right stile; and
wherein the left dowel connectors 2424 are attached to the left connection points 2324, such that the left cabinet side 2412 is attached to the inner/rear side of the left stile.

In a related embodiment, the right and left stiles 2302 2304 can each have a width 2340 in a range of ¾" to ⅞", ⅝" to ⅞", ½" to ⅞".

In another related embodiment, the full access cabinet 2500 can further include:
  right and left drawer rails 2512 2514, which are mounted on inner sides of respectively the right and left cabinet sides 2412 2414.

In a further related embodiment, the full access cabinet 2500 can further include:
  a drawer 2520, which can be mounted in the right and left drawer rails 2512 2514.

In yet a related embodiment, as shown in FIGS. 24 and 25, the right and left cabinet sides 2412 2414 can be perpendicularly connected to respectively the right and left stiles 2302 2304.

Figure 4A:
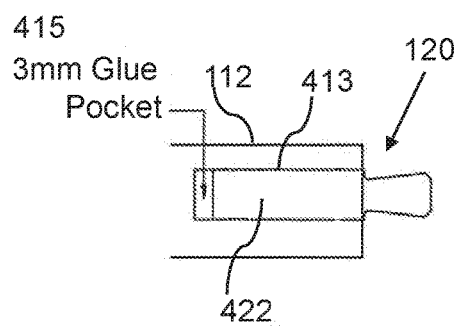
FIG. 4A is a side view of a slide-in dowel of the slide-in fastening system, according to an embodiment of the invention.
Figure 10A:
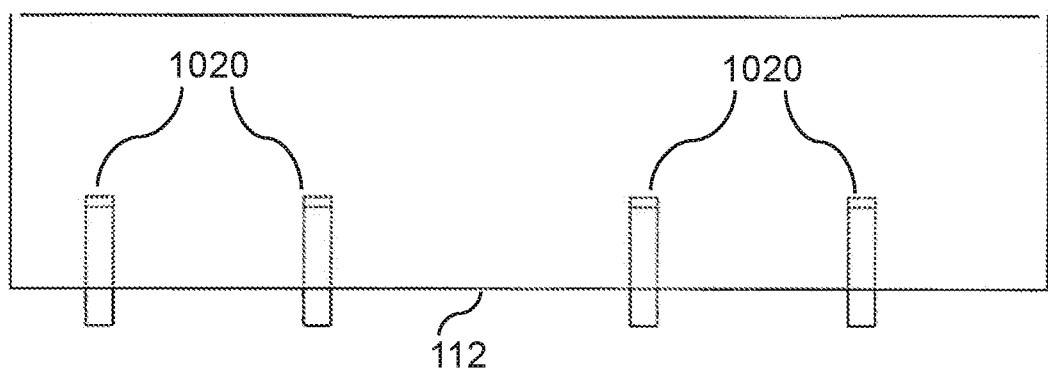
FIG. 10A is a top view of parts of a slide-in fastening system prior to shape manufacturing of slide-in dowels, according to an embodiment of the invention.

In yet another related embodiment, as shown in FIGS. 4A and 10A, the right and left cabinet sides 2412 2414 112 can each further comprise:
  predrilled apertures 413 with glue deposits 415 in bottoms of the predrilled apertures 413;
  wherein the right and left dowel connectors 2422 2424 are each permanently connected by insertion into a corresponding predrilled aperture 413 with a glue deposit inserted 415.

Figure 3A:
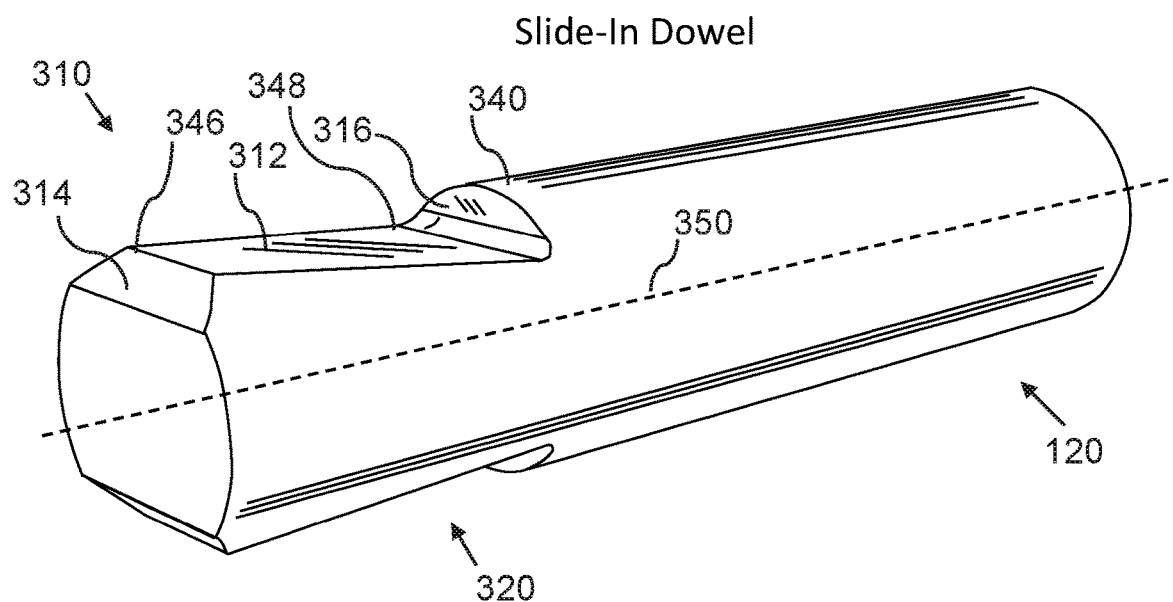
FIG. 3A is a front top perspective view of a slide-in dowel of the slide-in fastening system, according to an embodiment of the invention.
Figure 3B:
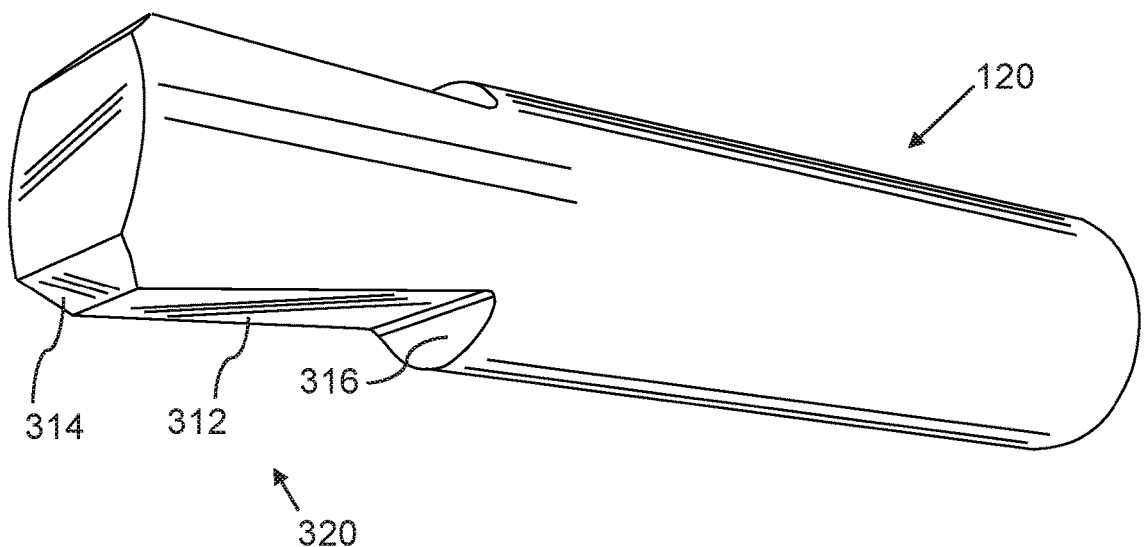
FIG. 3B is a front bottom perspective view of a slide-in dowel of the slide-in fastening system, according to an embodiment of the invention.
Figure 5A:
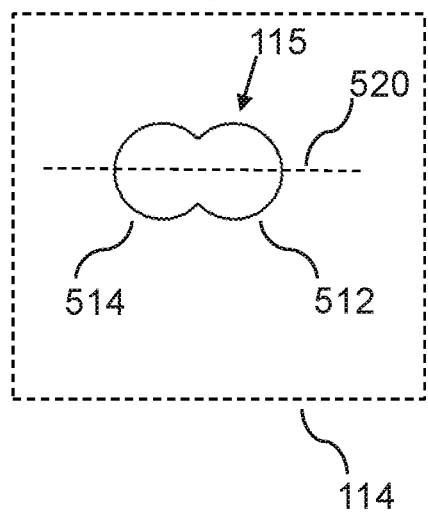
FIG. 5A is a front view of an insert aperture of the slide-in fastening system, according to an embodiment of the invention.
Figure 5B:
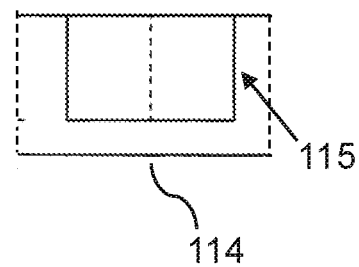
FIG. 5B is a side view of an insert aperture of the slide-in fastening system, according to an embodiment of the invention.

In another related embodiment, each of the right and left stiles 2302 2304 can include a plurality of insert apertures 115, as shown in FIGS. 5A and 5B, wherein each of the right and left connection points 2322 2324 comprise a slide-in insert 130, as shown in FIGS. 6A, 6B, 6C, and 6D, which is inserted into an insert aperture 115, wherein the slide-in insert comprises:
  an entry opening 612;
  an entry interior 613, such that the entry opening 612 connects to the entry interior 613;
  a target opening 614; and
  a target interior 615, such that the target opening 614 connects to the target interior 615;
  wherein the entry and target interiors 614 615 are connected/overlapping along an elongated direction 520;
  wherein each of the right and left dowel connectors 2422 2424 is a slide-in dowel 120, as shown in FIGS. 3A and 3B;
  such that the slide-in dowel 120 is configured to slide from the entry interior 613 into the target interior 615;
  wherein the slide-in dowel 120 is configured to be inserted through the entry opening 612, such that the slide-in dowel 120 reaches into the entry interior 613 of the slide-in insert 130, such that the slide-in dowel is then pushed sideways 140, in direction of and parallel to a lateral axis 640 of the slide-in insert 130, such that the slide-in dowel 130 is securely held in place inside the target interior 615; whereby the right and left cabinet sides 2412 2414 each are securely attachable to the full access frame 2300.

In another related embodiment, each of the right and left stiles 2302 2304 can include a plurality of insert apertures 1115, as shown in FIGS. 11 and 12, wherein each of the right and left connection points 2322 2324 comprise a snap-in insert 1130 that is inserted into an insert aperture 1115, wherein the snap-in insert comprises:
  an entry aperture 1612 and an insert interior 1613 that is accessible via the entry aperture 1612;
  wherein each of the right and left dowel connectors 2422 2424 is a snap-in dowel 1120;
  wherein the snap-in dowel 1120 is configured to be inserted through the entry aperture 1612, such that the snap-in dowel reaches into the insert interior 1613 of the snap-in insert 1130, such that the snap-in dowel 1120 is locked firmly in place inside the insert interior 1613;
  whereby the right and left cabinet sides 2412 2414 each are securely attachable to the full access frame 2300.

In an embodiment, as shown in FIG. 1, a system for slide-in fastening 100 can include:
  a) A first furniture member 112, which can be a first cabinet piece 112, such as a horizontal cabinet top/bottom 112, wherein the first furniture member 112 comprises:
    a plurality of slide-in dowels 120 protruding from an end of the first furniture member; and
  b) A second furniture member 114, which can be a second cabinet piece 114, such as a vertical cabinet side 114, wherein the second furniture member 114 comprises:
    a plurality of slide-in inserts 130 each inserted in insert apertures 115 that are positioned on an end of a side of the second furniture member 114;
    wherein the insert apertures 115, as shown in FIGS. 5A and 5B, can be substantially figure-eight shaped, comprising overlapping first and second circular apertures 512 514, which can be of similar or different diameter, such that the insert apertures 115 serve to orient vertical alignment of the slide-in inserts 130;
    wherein the slide-in inserts 130, as shown in FIGS. 6A, 6B, 6C, and 6D are figure-eight shaped and configured to be insertable into the insert apertures 115, as shown in FIGS. 5A and 5B, the slide-in inserts 130 each comprising a first opening 612, also called an entry opening 612, which connects to a first interior 613, also called an entry interior 613, and a second opening 614, also called a target opening 614, which connects to a second interior 615, also called a target interior 615, such that the entry and target interiors 613 615 are connected to form a combined interior 613 615 along an elongated direction 640 of each slide-in insert 130 (and similarly the entry and target opening 612 614 are connected to form a combined opening 612 614 along the elongated direction 640);
    such that the first furniture member 112 is attachable to the second furniture member 114 by inserting each of the plurality of slide-in dowels 120 through a corresponding entry opening 612, such that each dowel 120 reaches into the corresponding entry interior 613 of a corresponding slide-in insert 130, and then push the first furniture member 112 sideways 140 240, in direction of and parallel to a lateral axis 640 of the slide-in insert 130, as shown in FIGS. 1 and 2, such that the slide-in dowels each slide from the corresponding entry interior 613 into a corresponding target interior 615, such that the dowels 120 are each securely held in place inside a corresponding target interior 615;
    whereby, as shown in FIG. 2, the first furniture member 112 is securely attached to the second furniture member 114.

In related embodiments, the first and second furniture members 112 114 can be perpendicularly connected, such as shown in FIG. 2.

In related embodiments, the insert apertures 115, as shown in FIG. 5A, can be associated with a method of creating an elongated aperture, by drilling two intersecting/overlapping holes 512 514. The insert apertures 115 can thereby accommodate inserts of varying designs (i.e. be used for inserts other than the slide-in insert 130), which can be inserted with a well-defined vertical alignment.

In a related embodiment, as shown in FIGS. 3A and 3B, a slide-in dowel 120 can be configured as a cylindrical member including a top front cutout 310 and a bottom front cutout 320, each comprising:
- a) a cutout surface 312, which cuts at an angle so that the slide-in dowel narrows from a front 346 of the cutout surface 312 to a rear 348 of the cutout surface 312;
- b) an entry cut 314, which is a front cut that connects with a front of the cutout surface 312, such that the entry cut 314 is configured to ease insertion of the slide-in dowel; and
- c) a rear cut 316, which connects with a rear of the cutout surface 312 to reach the rear surface 340 of the slide-in dowel 120;

wherein the top and bottom front cutouts 310 320 are symmetrical around a center axis 350 of the slide-in dowel.

In a further related embodiment, the slide-in dowel 120 can be up-down asymmetrical, comprising only one of a top/first front cutout 310 or a bottom/second front cutout 320, such that an opposite side to the top front cutout 310 or bottom front cutout 320 is an unmodified rounded/cylindrical dowel surface.

Figure 4B:
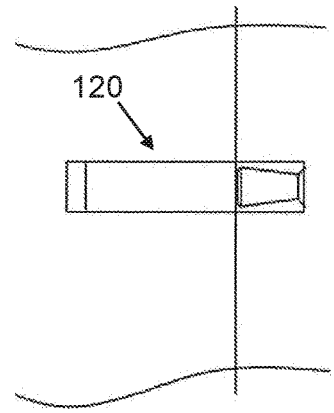
FIG. 4B is a top view of a slide-in dowel of the slide-in fastening system, according to an embodiment of the invention.
Figure 4C:
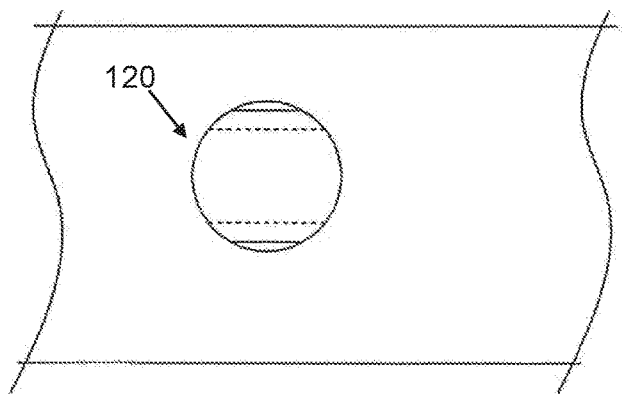
FIG. 4C is a front view of a slide-in dowel of the slide-in fastening system, according to an embodiment of the invention.

In a related embodiment, as shown in FIG. 4A, a rear end 422 of the slide-in dowel 120 can be permanently connected to the first furniture member 112, by insertion of the rear end 422 into a predrilled aperture 413 of the first furniture member 112, with a glue pocket/deposit 415 inserted in a bottom of the predrilled aperture. FIGS. 4B and 4C show respectively top and front views of the slide-in dowel 120.

Figure 4D:
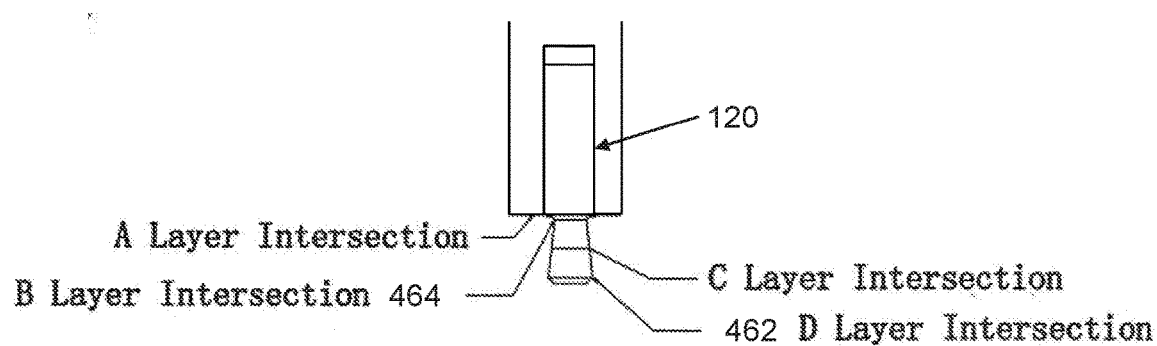
FIG. 4D is a side view of a slide-in dowel of the slide-in fastening system, according to an embodiment of the invention.

In a related embodiment, FIG. 4D shows a side view of the varying vertical width of the front of the slide-in dowel 120 between the top and bottom front cutouts 310 320, going from a front maximum width 462 to a minimum width 464.

Figure 7A:
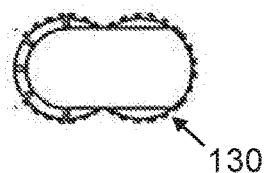
FIG. 7A is a lateral cross-sectional view of a slide-in insert of the slide-in fastening system, according to an embodiment of the invention.
Figure 7B:
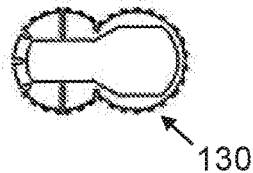
FIG. 7B is a lateral cross-sectional view of a slide-in insert of the slide-in fastening system, according to an embodiment of the invention.
Figure 7C:
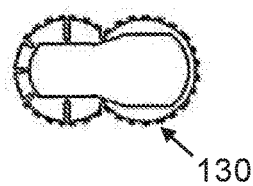
FIG. 7C is a lateral cross-sectional view of a slide-in insert of the slide-in fastening system, according to an embodiment of the invention.
Figure 7D:
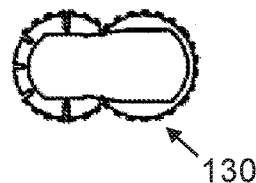
FIG. 7D is a lateral cross-sectional view of a slide-in insert of the slide-in fastening system, according to an embodiment of the invention.

In a related embodiment, FIGS. 6A-6D and 7A-7E shows, in lateral sectional cuts, that the target interior gradually expands, from an outer side in layer B 510B, shown in FIGS. 6A and 7B, to an inner side in layer D 510D, shown in FIGS. 6A and 7D, such that the shape of a front end of a slide-in dowel 120 with top front cutout 310 and a bottom front cutout 320 is configured to match with the shape of the target interior, such that when the slide-in dowel is pushed sideways from the entry interior 613 into the target interior 615, the slide-in dowel 120 will be pulled inwards to reach the matching shape of the target interior, whereby the slide-in dowel 120 is securely and tightly connected in the target interior 615. The inward pull of a plurality of slide-in dowels 120 will thereby ensure that the first and second furniture members 112 114 are pulled tightly and securely together, as shown in FIG. 2.

Figure 7E:
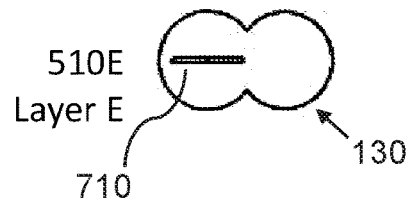
FIG. 7E is a lateral cross-sectional view of a slide-in insert of the slide-in fastening system, according to an embodiment of the invention.

In a further related embodiment, as shown in FIG. 7E, a bottom of the target interior 615 can include a bottom elongated guide protrusion 710, which is configured to adjust a position of the slide-in dowel 120 and ensure that the slide-in dowel 120 can be moved into the target interior 615 with minimal friction. In some embodiments the target interior 615 may not have a bottom, such that the target interior 615 protrudes through the slide-in insert 130.

Figure 8:
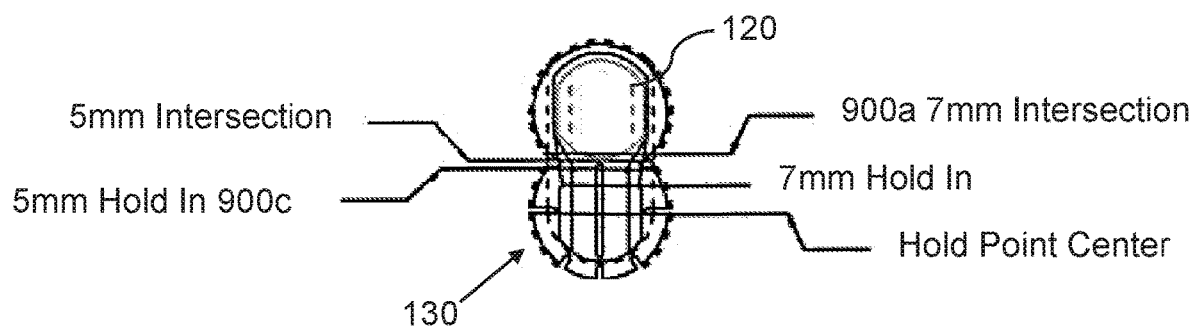
FIG. 8 is a front view of a slide-in insert of the slide-in fastening system, according to an embodiment of the invention.
Figure 9A:
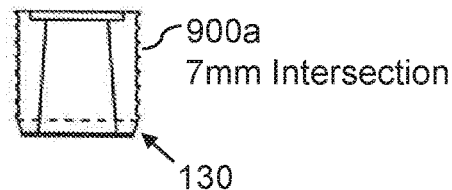
FIG. 9A is a longitudinal cross-sectional view of a slide-in insert of the slide-in fastening system, according to an embodiment of the invention.
Figure 9D:
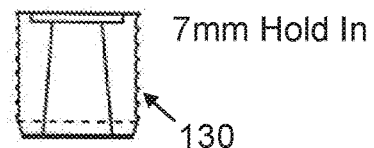
FIG. 9D is a longitudinal cross-sectional view of a slide-in insert of the slide-in fastening system, according to an embodiment of the invention.
Figure 9B:
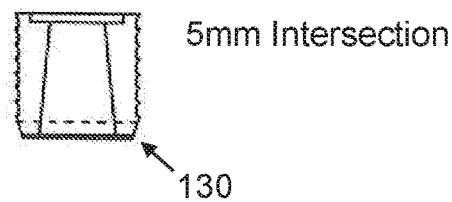
FIG. 9B is a longitudinal cross-sectional view of a slide-in insert of the slide-in fastening system, according to an embodiment of the invention.
Figure 9E:
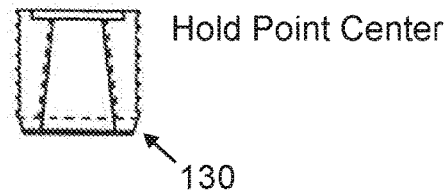
FIG. 9E is a longitudinal cross-sectional view of a slide-in insert of the slide-in fastening system, according to an embodiment of the invention.
Figure 9C:
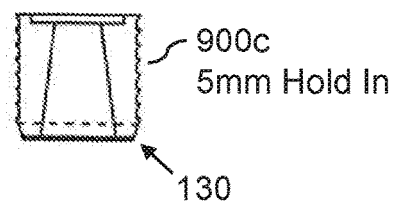
FIG. 9C is a longitudinal cross-sectional view of a slide-in insert of the slide-in fastening system, according to an embodiment of the invention.

In a related embodiment, FIGS. 8 and 9A-9E shows, in longitudinal sectional cuts, that the target interior provides a side opening that narrows from a 7 mm intersection position 900a, shown in FIGS. 9A and 8, towards a minimum 5 mm hold In position 900c, shown in FIGS. 9C and 8, and then expands, as shown in FIGS. 9D and 9E, such that the slide-in dowel 120 is securely held in position when the slide-in dowel 120 slides past the 5 mm hold in position 900c. Other sizing can be applied, the specific dimensions provided here are merely exemplary. FIGS. 6B and 8 show the slide-in insert 130 with the slide-in dowel 120 inserted into the entry interior 613.

In a related embodiment, as shown in FIG. 6C, the slide-in insert 130 can have serrated edges 620, which can also be referred to as ribbed edges 620, on sides of the slide-in insert 130, such that the serrated edges 620 help secure the slide-in insert 130 inside the insert aperture 115.

In a further related embodiment, the target interior 615 can be configured with a size that matches the slide-in dowels 120, such that the slide-in insert 130 expands slightly when the slide-in dowels 120 are pushed into the target interior 615, whereby the slide-in insert 130 is further secured inside the insert aperture 115, as the serrated edges expand into inner sides of the insert apertures 115. The slide-in insert 130 expands throughout the entire length 650 of a target portion 630 of the slide-in insert 130, around an entire length 650 of the target interior 615.

In a yet further related embodiment, the slide-in insert 130 can further include expansion slits 632 on an outer surface of the slide-in insert 130. The expansion slits can be positioned solely on an outer surface of the target portion 630 of the slide-in insert 130. The expansion slits 632 can be located to control the expanding portions of the slide-in insert 130, such that omission of expansion slits 632 can ensure a substrate 114 is only compressed in areas of sufficient strength.

Figure 10B:
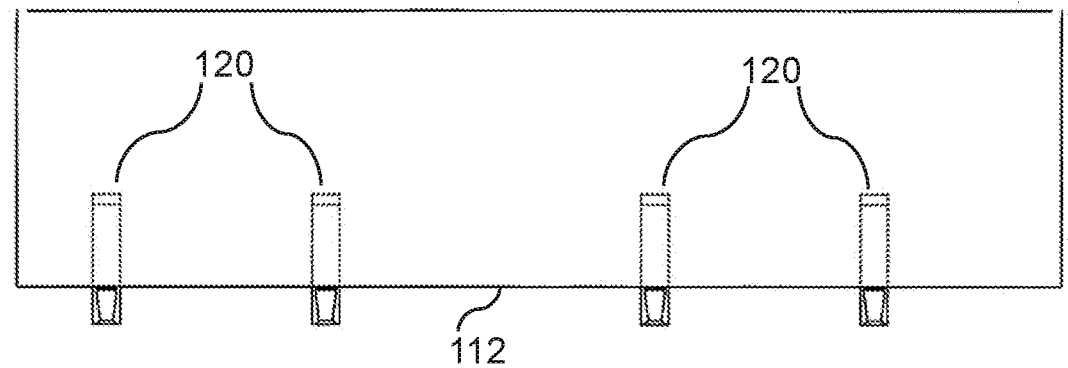
FIG. 10B is a top view of parts of a slide-in fastening system with slide-in dowels manufactured, according to an embodiment of the invention.

In a related embodiment, as shown in FIGS. 10A and 10B, a method of manufacturing slide-in dowels 120, can comprise:
- a) Inserting cylindrical dowels 1020 into a furniture member 112, wherein the dowels 1020 are conventional dowels, shaped as solid cylindrical rods, for example made of wood or plastic, such that the dowels 1020 are glued into predrilled apertures, as shown in FIG. 10A;
- b) Machining the exposed end of the cylindrical dowels 1020, to create the top front cutout 310 and a bottom front cutout 320, for example using a cutting or grinding tool, such that the cylindrical dowels 1020 are transformed to slide-in dowels 120, as shown in FIG. 10B.

In various related embodiments, the system for slide-in fastening 100 can:
- a) Enable drilling multiple overlapping holes for parallel alignment versus machining a slot, thereby allowing much faster manufacturing
- b) Allow machining/shaping of round dowels 1020 after dowels 1020 are inserted into host material for the purpose of creating precision parallel or perpendicular alignment and precise machining characteristics relative to host material;
- c) Create significant compression and prohibit perpendicular pullout due to dovetail shape of the slide-in insert 130;
- d) Allow glue-less assembly of products, without use of screws and/or CNC Routers; and
- e) Allow compression connectors to be hidden without use of CNC routers.

Figure 15A:
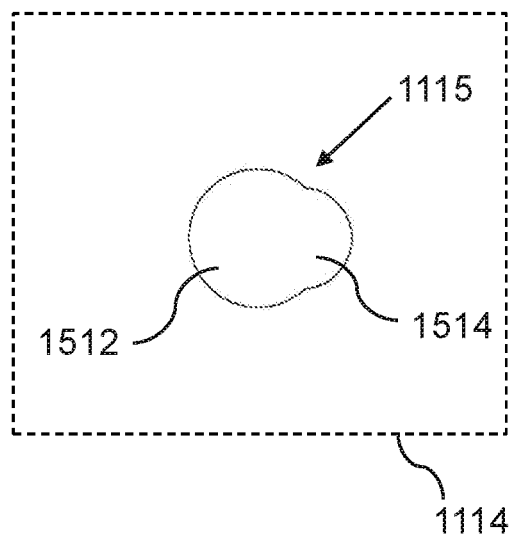
FIG. 15A is a front view of an insert aperture of the snap-in fastening system, according to an embodiment of the invention.
Figure 15B:
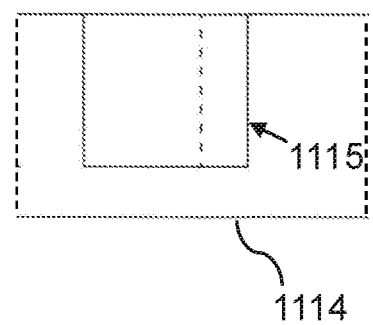
FIG. 15B is a side view of an insert aperture of the snap-in fastening system, according to an embodiment of the invention.
Figure 15C:
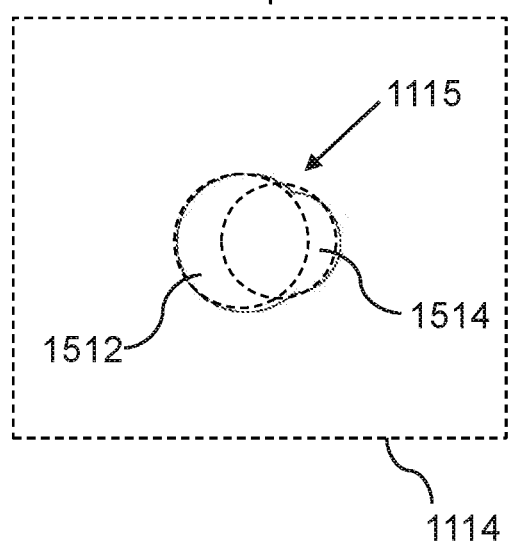
FIG. 15C is a front view of an insert aperture of the snap-in fastening system, according to an embodiment of the invention.

In an embodiment, as shown in FIGS. 11 and 12, a system for snap-in fastening 1100 can include:
- a) A first furniture member 112, which can be a first cabinet piece 112, such as a horizontal cabinet top/bottom 112, wherein the first furniture member 112 comprises:

a plurality of snap-in dowels 1120 protruding from an end of the first furniture member 112; and b) A second furniture member 114, which can be a second cabinet piece 114, such as a vertical cabinet side 114, wherein the second furniture member 114 comprises:
a plurality of snap-in insert 1130 each inserted in insert apertures 1115 that are positioned on an end of a side of the second furniture member 114; and wherein the insert apertures 1115, as shown in FIGS. 15A, 15B, and 15C, can comprise overlapping first and second circular apertures 1512 1514, which can be of similar or different diameter, such as shown with the second circular aperture 1514 of substantially smaller diameter;

wherein the snap-in inserts 1130, as shown in FIGS. 16A, 16B, 16C, and 16D, are configured to be insertable into the insert apertures 1115, shown in FIGS. 15A and 15B, the snap-in inserts 1130 each comprising an entry aperture 1612, which connects to an insert interior 1613;

wherein the snap-in inserts 1130 can be substantially circular with a side protrusion 1680, which serves to orient vertical alignment of the snap-in inserts 1130;

such that the first furniture member 112 is attachable to the second furniture member 114 by inserting each of the plurality of snap-in dowels 1120 through a corresponding entry aperture 1612, such that it reaches into the corresponding insert interior 1613 of a corresponding snap-in insert 1130, such that the snap-in dowels 1120 each slide into the corresponding insert interior 1613, such that the snap-in dowels 1120 are each locked firmly in place inside a corresponding insert interior 1613; whereby, as shown in FIG. 2, the first furniture member 112 is securely attached to the second furniture member 114.

In related embodiments, the first and second furniture members 112 114 can be perpendicularly connected, such as shown in FIG. 12.

In related embodiments, the insert apertures 1115, as shown in FIG. 15A, can be associated with a method of creating an elongated aperture, by drilling two intersecting/overlapping holes 1512 1514. The insert apertures 1115 can thereby accommodate inserts of varying designs (i.e. be used for inserts other than the snap-in insert 1130), which can be inserted with a well-defined vertical alignment.

Figure 13A:
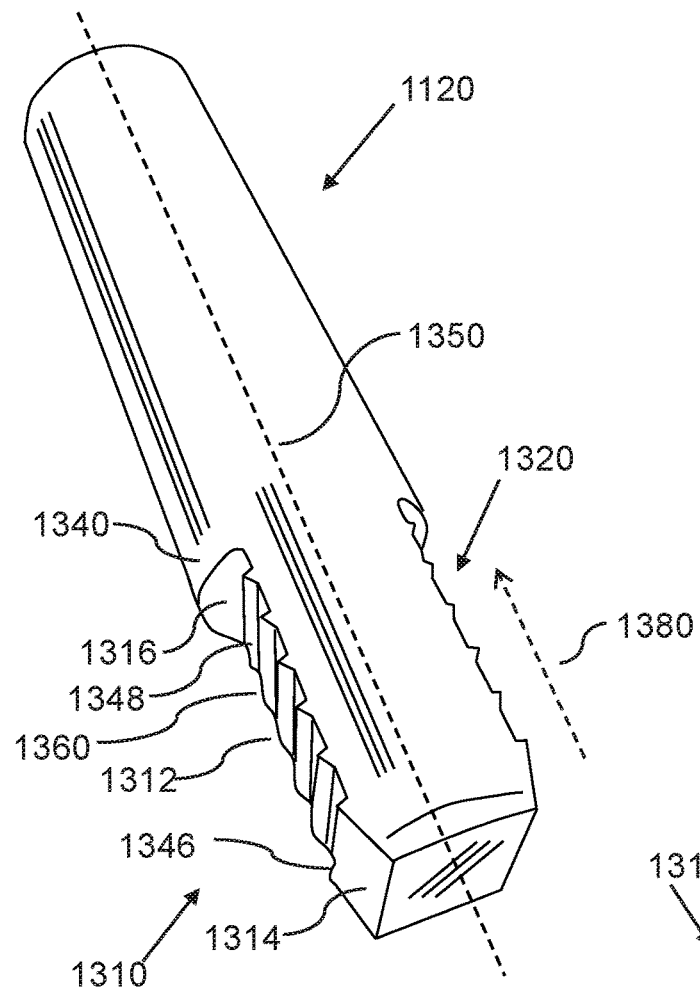
FIG. 13A is a front top perspective view of a snap-in dowel of the snap-in fastening system, according to an embodiment of the invention.
Figure 13B:
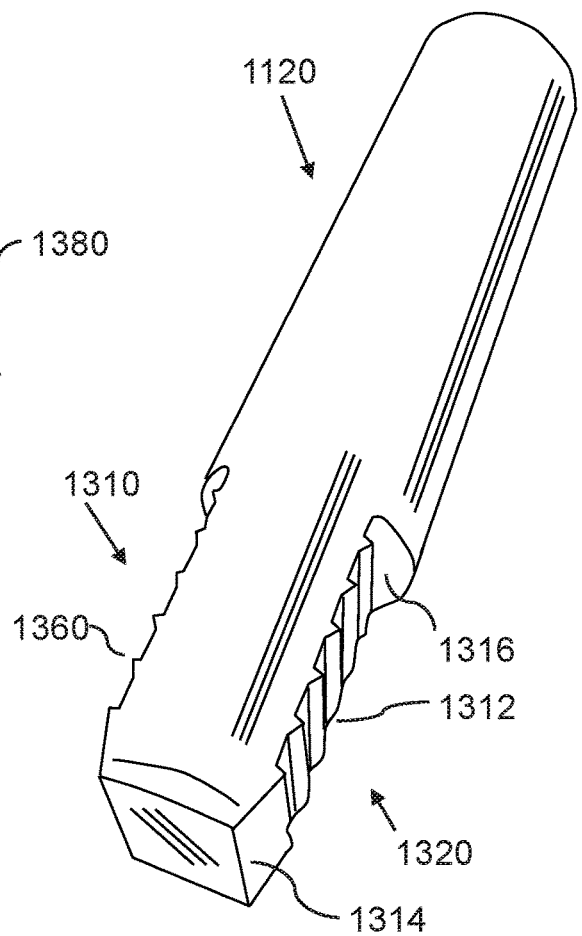
FIG. 13B is a front bottom perspective view of a snap-in dowel of the snap-in fastening system, according to an embodiment of the invention.

In a related embodiment, as shown in FIGS. 13A and 13B, a snap-in dowel 1120 can be configured as a cylindrical member including a top front cutout 1310 and a bottom front cutout 1320, each comprising:

a) a cutout surface 1312, such that the snap-in dowel 1120 has a uniform width from a front 1346 of the cutout surface 1312 to a rear 1348 of the cutout surface 1312, wherein the cutout surface 1312 further comprises:
i. a plurality of dowel ribs 1360, which can be rearward 1380 pointing, which are configured to aid in locking the snap-in dowel 1120 in place inside a snap-in insert 1130, such that the rearward 1380 pointing dowel ribs 1360 interlock with inward 1644 pointing inner ribbed edges 1672 1674 of the snap-in insert 1130 (i.e the rearward 1380 pointing dowel ribs 1360 can also be referred to as outward 1380 pointing in relation to the inward 1644 pointing inner ribbed edges 1672 1674). The dowel ribs 1360 can also be referred to as dowel serrated edges 1360, or dowel ribbed edges 1360;

b) an entry cut 1314, which is a front cut that connects with a front of the cutout surface 1312, such that the entry cut 1314 is configured to ease insertion of the snap-in dowel 1120; and c) a rear cut 1316, which connects with a rear of the cutout surface 1312 to reach the rear surface 1340 of the snap-in dowel 1120;

wherein the top and bottom front cutouts 1310 1320 are symmetrical around a center axis 1350 of the snap-in dowel.

In a further related embodiment, the snap-in dowel 1120 can be up-down asymmetrical, comprising only one of a top front cutout 1310 or a bottom front cutout 1320, such that an opposite side to the top front cutout 1310 or bottom front cutout 1320 is an unmodified rounded/cylindrical dowel surface.

Figure 14A:
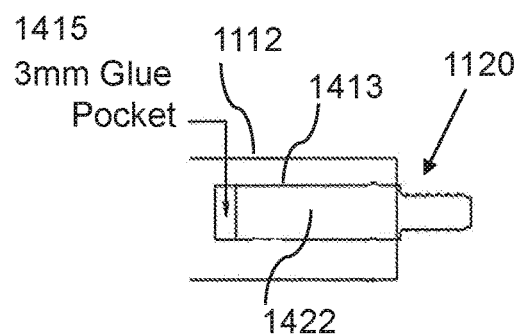
FIG. 14A is a side view of a snap-in dowel of the snap-in fastening system, according to an embodiment of the invention.
Figure 14B:
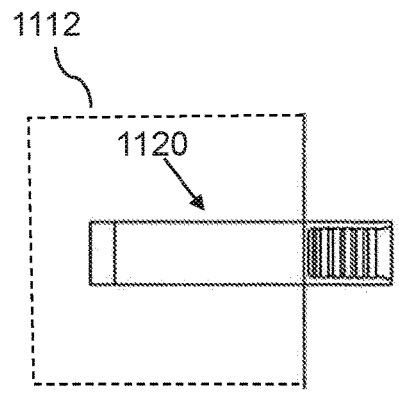
FIG. 14B is a top view of a snap-in dowel of the snap-in fastening system, according to an embodiment of the invention.
Figure 14C:
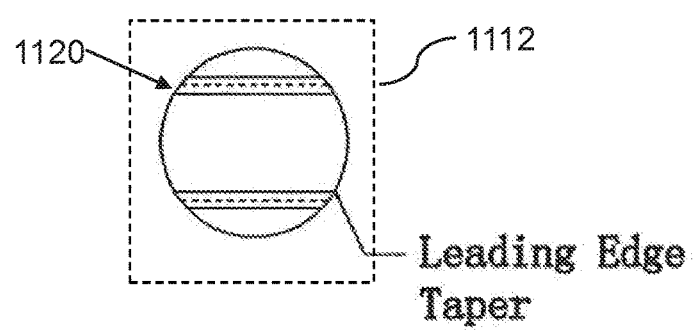
FIG. 14C is a front view of a snap-in dowel of the snap-in fastening system, according to an embodiment of the invention.

In a related embodiment, as shown in FIG. 14A, a rear end 1422 of the snap-in dowel 1120 can be permanently connected to by insertion of the rear end 1422 into a predrilled aperture 1413 of the first furniture member 1112, with a glue pocket/deposit 1415 inserted in a bottom of the predrilled aperture. FIGS. 14B and 14C show respectively top and front views of the snap-in dowel 1120.

Figure 14D:
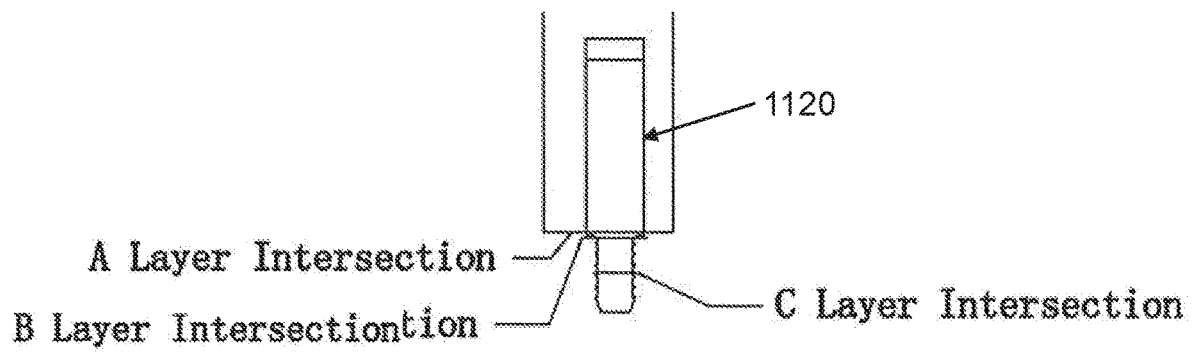
FIG. 14D is a side view of a snap-in dowel of the snap-in fastening system, according to an embodiment of the invention.

In a related embodiment, FIG. 14D shows a side view of the uniform vertical width of the front of the snap-in dowel 1120 between the top and bottom front cutouts 1310 1320.

Figure 16A:
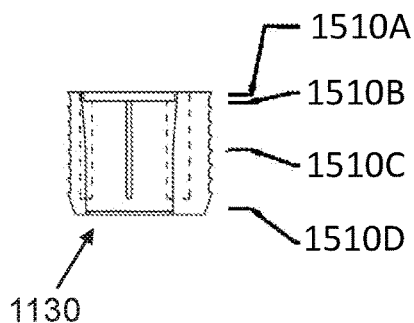
FIG. 16A is a side view of a snap-in insert of the snap-in fastening system, according to an embodiment of the invention.
Figure 16B:
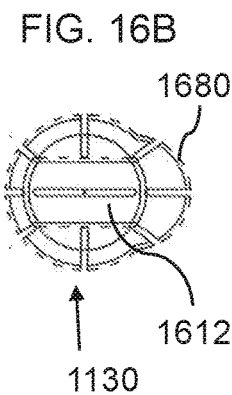
FIG. 16B is a top view of a snap-in insert of the snap-in fastening system, according to an embodiment of the invention.
Figure 16C:
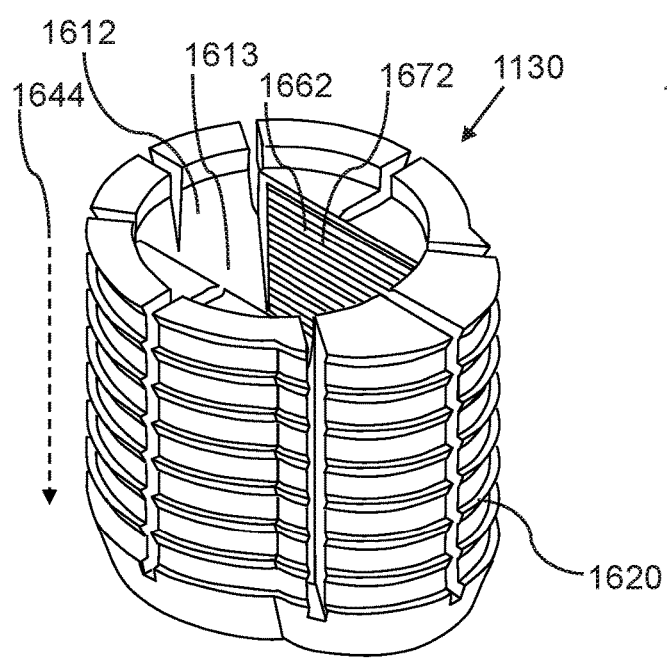
FIG. 16C is a perspective view of a snap-in insert of the snap-in fastening system, according to an embodiment of the invention.
Figure 16D:
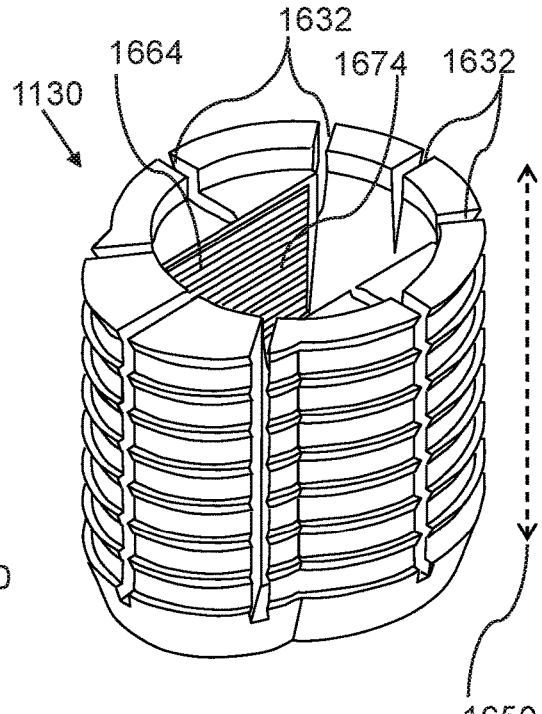
FIG. 16D is a perspective view of a snap-in insert of the snap-in fastening system, according to an embodiment of the invention.
Figure 16E:
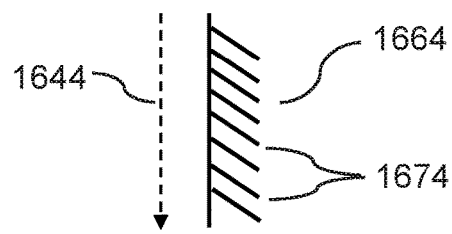
FIG. 16E is a longitudinal cross-sectional view of part of a snap-in insert of the snap-in fastening system, according to an embodiment of the invention.

In a related embodiment, as shown in FIGS. 16C and 16D, the snap-in insert 1130 can have outer serrated edges 1620, which can also be referred to as outer ribbed edges 1620, on sides of the snap-in insert 1130, such that the outer serrated edges 1620 help secure the snap-in insert 1130 inside the insert aperture 1115. Further the top and bottom sides 1662 1664 of the insert interior can be lined with top and bottom inner serrated edges 1672 1674, which can also be referred to as top and bottom inner ribbed edges 1672 1674, which can be configured to be inward 1644 pointing, as shown in FIGS. 6C, 6D, and 6E.

Figure 17A:
FIG. 17A is a lateral cross-sectional view of a snap-in insert of the snap-in fastening system, according to an embodiment of the invention.
Figure 17B:
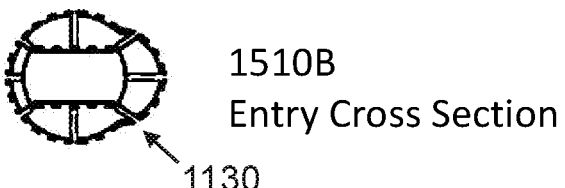
FIG. 17B is a lateral cross-sectional view of a snap-in insert of the snap-in fastening system, according to an embodiment of the invention.
Figure 17C:
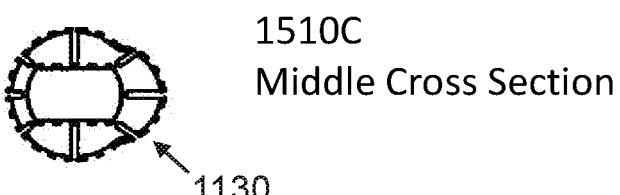
FIG. 17C is a lateral cross-sectional view of a snap-in insert of the snap-in fastening system, according to an embodiment of the invention.
Figure 17D:
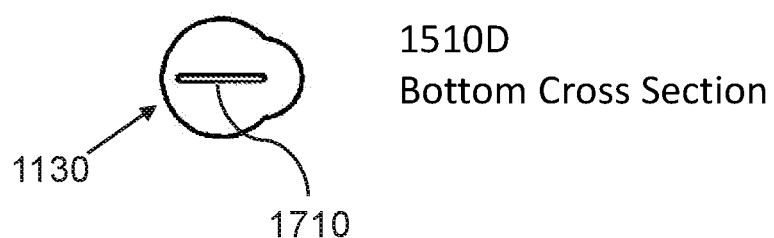
FIG. 17D is a lateral cross-sectional view of a snap-in insert of the snap-in fastening system, according to an embodiment of the invention.

In a related embodiment, FIG. 16A in conjunction with FIGS. 17A, 17B, 17C, and 17D show, in lateral sectional cuts, that the insert interior has uniform width, from an entry cross section 1510B, shown in FIGS. 16A and 17B, through a middle cross section 1510C, shown in FIGS. 16A and 17C, such that the shape of a front end of a snap-in dowel 1120 with top front cutout 1310 and a bottom front cutout 1320 is configured to match with the shape of the insert interior 1613, such that when the snap-in dowel 1120 is inserted into the insert interior 1613, rearward/outward 1380 pointing dowel ribs 1360 of the snap-in dowel 1120 will engage/interlock with inward 1644 pointing inner serrated edges 1672 1674, whereby the snap-in dowel 1120 is securely and tightly locked into the insert interior 1613. The secure and tight fit of a plurality of snap-in dowels 1120 will thereby ensure that the first and second furniture members 112 114 are pulled tightly and securely together, as shown in FIG. 12. Additionally, FIGS. 16A and 17A show the top cross section 1510A, and FIGS. 16A and 17D show the bottom cross section 1510D.

In a further related embodiment, as shown in FIG. 17D, showing the bottom cross section 1510D, a bottom of the insert interior 1613 can include a bottom elongated guide protrusion 1710, which is configured to adjust a position of the snap-in dowel 1120 and ensure that the snap-in dowel 1120 can be moved into the insert interior 1613 with minimal friction. In some embodiments, the insert interior 1613 may not have a bottom, such that the insert interior 1613 protrudes through the slide-in insert 1130.

Figure 18:
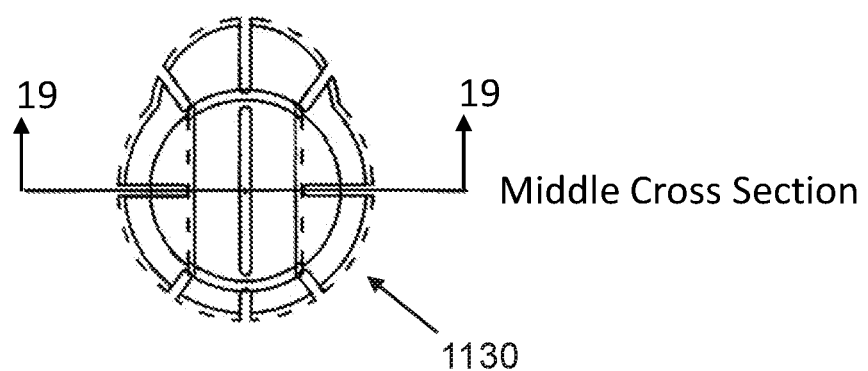
FIG. 18 is a front view of a snap-in insert of the snap-in fastening system, according to an embodiment of the invention.
Figure 19:
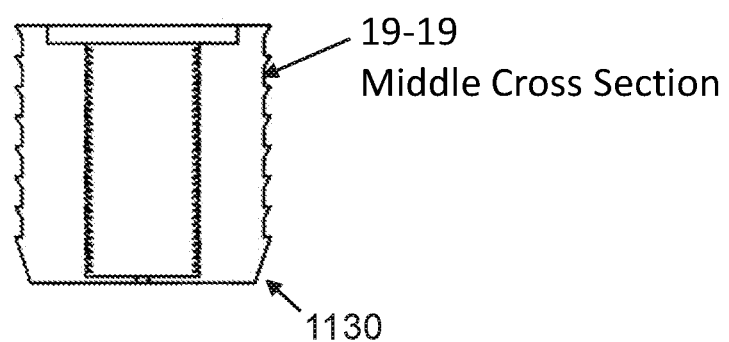
FIG. 19 is a longitudinal cross-sectional view of a snap-in insert of the snap-in fastening system, according to an embodiment of the invention.

In a related embodiment, FIGS. 18 and 19 show in a longitudinal sectional cut 19-19 that the insert interior 1613 is configured with a uniform width between top and bottom sides of the insert interior 1613. Other sizing can be applied, the specific dimensions provided here are merely exemplary.

In a further related embodiment, the insert interior 1613 can be configured with a size that matches the snap-in dowels 1120, such that the snap-in insert 1130 expands slightly when the snap-in dowel 1120 is pushed into the insert interior 1613, whereby the snap-in insert 1130 is further secured inside the insert aperture 1115, as the outer serrated edges expand into sides of the insert apertures 1115. The snap-in insert 1130 expands throughout the entire length 1650 of the snap-in insert 1130.

In a yet further related embodiment, the snap-in insert 1130 can further include expansion slits 1632 on an outer surface of the snap-in insert 1130. The expansion slits 1632 can be located to control the expanding portions of the snap-in insert 1130, such that omission of expansion slits 1632 can ensure a substrate 114 is only compressed in areas of sufficient strength.

Figure 20A:
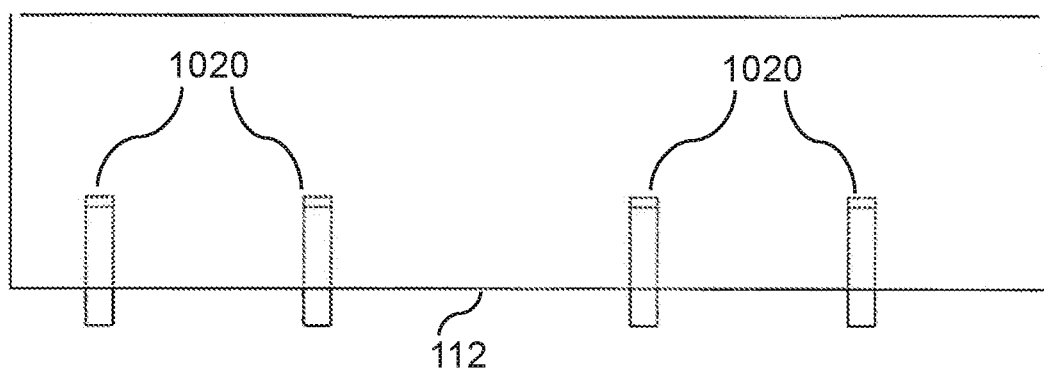
FIG. 20A is a top view of parts of a snap-in fastening system prior to shape manufacturing of snap-in dowels, according to an embodiment of the invention.
Figure 20B:
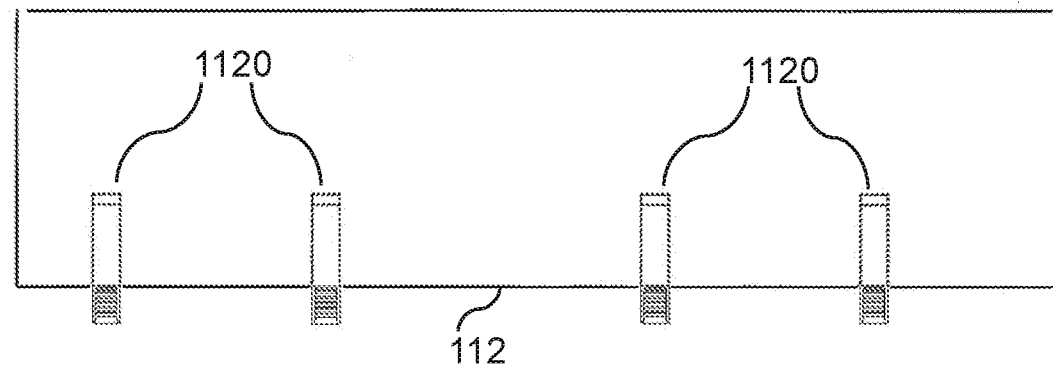
FIG. 20B is a top view of parts of a snap-in fastening system with snap-in dowels manufactured, according to an embodiment of the invention.

In a related embodiment, as shown in FIGS. 20A and 20B, a method of manufacturing snap-in dowels 1120, can comprise:
a) Inserting dowels 1020 into a furniture member 112, wherein the dowels 1020 are conventional dowels, shaped as solid cylindrical rods, for example made of wood or plastic, such that the dowels 1020 are glued into predrilled apertures, as shown in FIG. 20A;
b) Machining the exposed end of the dowels 1020, to create the top front cutout 1310 and a bottom front cutout 1320, for example using a cutting or grinding tool, such that the dowels 1020 are transformed to snap-in dowels 1120, as shown in FIG. 20B.

In various related embodiments, the system for snap-in fastening 1100 can:
a) Allow machining/shaping of round dowels 1020 after dowels 1020 are inserted into host material for the purpose of creating precision parallel or perpendicular alignment and precise machining characteristics relative to host material;
b) Create significant compression and prohibit perpendicular pullout due to interlocking serrated edges 1672 1674 of the snap-in insert 1130;
c) Allow glue-less assembly of products, without use of screws and/or CNC Routers; and
d) Allow compression connectors to be hidden without use of CNC routers.

Here has thus been described a multitude of embodiments of the framed full access cabinet 2500, including devices and methods related thereto, which can be employed in numerous modes of usage.

The many features and advantages of the invention are apparent from the detailed specification, and thus, it is intended by the appended claims to cover all such features and advantages of the invention, which fall within the true spirit and scope of the invention.

Many such alternative configurations are readily apparent, and should be considered fully included in this specification and the claims appended hereto. Accordingly, since numerous modifications and variations will readily occur to those skilled in the art, it is not desired to limit the invention to the exact construction and operation illustrated and described, and thus, all suitable modifications and equivalents may be resorted to, falling within the scope of the invention.

What is claimed is:

1. A full access cabinet, comprising:
a) a full access frame, comprising:
a right stile, comprising a plurality of right connection points positioned on an inner side of the right stile; and
a left stile, comprising a plurality of left connection points positioned on an inner side of the left stile;
b) a right cabinet side, comprising a plurality of right dowel connectors, which protrude from an outer end of the right cabinet side; and
c) a left cabinet side, comprising a plurality of left dowel connectors, which protrude from an outer end of the left cabinet side;
wherein the right dowel connectors are attached to the right connection points, such that the right cabinet side is attached to the inner side of the right stile; and
wherein the left dowel connectors are attached to the left connection points, such that the left cabinet side is attached to the inner side of the left stile;
wherein each of the right stile and the left stile comprise a plurality of insert apertures, wherein each of the right connection points and the left connection points comprise a snap-in insert that is inserted into an insert aperture, wherein the snap-in insert comprises:
an entry aperture and an insert interior that is accessible via the entry aperture;
wherein each of the right dowel connectors and the left dowel connectors is a snap-in dowel;
wherein the snap-in dowel is configured to be inserted through the entry aperture, such that the snap-in dowel reaches into the insert interior of the snap-in insert, such that the snap-in dowel is locked firmly in place inside the insert interior;
whereby the right cabinet side and the left cabinet side each are securely attachable to the full access frame;
wherein each insert aperture in the plurality of insert apertures comprises overlapping first and second circular apertures.

2. The full access cabinet of claim 1, wherein the right stile and the left stile each have a width in a range of ⅝" to ⅞".

3. The full access cabinet of claim 1, further comprising:
right and left drawer rails, which are mounted on inner sides of respectively the right cabinet side and the left cabinet side.

4. The full access cabinet of claim 3, further comprising:
a drawer, which is mounted in the right and left drawer rails.

5. The full access cabinet of claim 1, wherein the right cabinet side and the left cabinet side are perpendicularly connected to respectively the right stile and the left stile.

6. The full access cabinet of claim 1, wherein the right cabinet side and the left cabinet side each further comprise:
predrilled apertures with glue deposits in bottoms of the predrilled apertures;
wherein rear ends of the right dowel connectors and the left dowel connectors are each permanently connected by insertion of the rear ends into a corresponding predrilled aperture with a glue deposit.

7. The full access cabinet of claim 1, wherein a diameter of the first circular aperture is larger than a diameter of the second circular aperture;
wherein the snap-in insert is substantially circular with a side protrusion, which serves to orient vertical alignment of the snap-in insert.

8. The full access cabinet of claim 1, wherein the snap-in dowel is configured as a cylindrical member, which comprises a top front cutout and a bottom front cutout, each comprising:
- a cutout surface, such that the snap-in dowel is configured with a uniform width from a front of the cutout surface to a rear of the cutout surface;
- wherein the top front cutout and the bottom front cutout are symmetrical around a center axis of the snap-in dowel;
- such that the snap-in dowel is configured with a uniform vertical width of the front of the snap-in dowel between the top front cutout and the bottom front cutout.

9. The full access cabinet of claim 8, wherein the cutout surface further comprises a plurality of dowel ribs, which are configured to aid in locking the snap-in dowel in place inside the snap-in insert.

10. The full access cabinet of claim 9, wherein the dowel ribs are configured to be rearward pointing dowel ribs.

11. The full access cabinet of claim 10, wherein top and bottom sides of the insert interior are lined with respectively top and bottom inner ribbed edges.

12. The full access cabinet of claim 11, wherein the top and bottom inner ribbed edges are configured to be inward pointing inner ribbed edges;
- such that the inward pointing inner ribbed edges are configured to interlock with the rearward pointing dowel ribs.

13. The full access cabinet of claim 8, wherein each of the top front cutout and the bottom front cutout further comprise:
a) an entry cut, which is a front cut that connects with a front of the cutout surface, such that the entry cut is configured to ease insertion of the snap-in dowel; and
b) a rear cut, which connects with a rear of the cutout surface to reach a rear surface of the snap-in dowel.

14. The full access cabinet of claim 1, wherein the snap-in insert is configured with outer ribbed edges, such that the outer ribbed edges are configured to secure the snap-in insert inside the insert aperture.

15. The full access cabinet of claim 14, wherein the insert interior is configured with a size that matches the snap-in dowel, such that the snap-in insert is configured to expand when the snap-in dowel is pushed into the insert interior, whereby the snap-in insert is further secured inside the insert aperture, as the outer ribbed edges expand into sides of the insert apertures, along a length of the snap-in insert.

16. The full access cabinet of claim 15, wherein the snap-in insert further comprises a plurality of expansion slits on an outer surface of the snap-in insert.

17. The full access cabinet of claim 1, wherein a bottom of the insert interior further comprises a bottom elongated guide protrusion, which is configured to adjust a position of the snap-in dowel and ensure that the snap-in dowel is moveable into the insert interior with minimal friction.

18. The full access cabinet of claim 1, wherein the full access frame further comprises:
a) a top rail, which is horizontally connected between upper ends of the right stile and the left stile; and
b) a bottom rail, which is horizontally connected between lower ends of the right stile and the left stile.

19. A full access cabinet, comprising:
a) a full access frame, comprising:
- a right stile, comprising a plurality of right connection points positioned on an inner side of the right stile; and
- a left stile, comprising a plurality of left connection points positioned on an inner side of the left stile;

b) a right cabinet side, comprising a plurality of right dowel connectors, which protrude from an outer end of the right cabinet side; and
c) a left cabinet side, comprising a plurality of left dowel connectors, which protrude from an outer end of the left cabinet side;
wherein the right dowel connectors are attached to the right connection points, such that the right cabinet side is attached to the inner side of the right stile; and
wherein the left dowel connectors are attached to the left connection points, such that the left cabinet side is attached to the inner side of the left stile;
wherein each of the right stile and the left stile comprise a plurality of insert apertures, wherein each of the right connection points and the left connection points comprise a snap-in insert that is inserted into an insert aperture, wherein the snap-in insert comprises:
- an entry aperture and an insert interior that is accessible via the entry aperture;
wherein each of the right dowel connectors and the left dowel connectors is a snap-in dowel;
wherein the snap-in dowel is configured to be inserted through the entry aperture, such that the snap-in dowel reaches into the insert interior of the snap-in insert, such that the snap-in dowel is locked firmly in place inside the insert interior;
whereby the right cabinet side and the left cabinet side each are securely attachable to the full access frame;
wherein the snap-in dowel is configured as a cylindrical member, which comprises a top front cutout and a bottom front cutout, each comprising:
a cutout surface, such that the snap-in dowel is configured with a uniform width from a front of the cutout surface to a rear of the cutout surface;
wherein the top front cutout and the bottom front cutout are symmetrical around a center axis of the snap-in dowel;
such that the snap-in dowel is configured with a uniform vertical width of the front of the snap-in dowel between the top front cutout and the bottom front cutout.

20. A full access cabinet, comprising:
a) a full access frame, comprising:
- a right stile, comprising a plurality of right connection points positioned on an inner side of the right stile; and
- a left stile, comprising a plurality of left connection points positioned on an inner side of the left stile;
b) a right cabinet side, comprising a plurality of right dowel connectors, which protrude from an outer end of the right cabinet side; and
c) a left cabinet side, comprising a plurality of left dowel connectors, which protrude from an outer end of the left cabinet side;
wherein the right dowel connectors are attached to the right connection points, such that the right cabinet side is attached to the inner side of the right stile; and
wherein the left dowel connectors are attached to the left connection points, such that the left cabinet side is attached to the inner side of the left stile;
wherein each of the right stile and the left stile comprise a plurality of insert apertures, wherein each of the right connection points and the left connection points comprise a snap-in insert that is inserted into an insert aperture, wherein the snap-in insert comprises:

an entry aperture and an insert interior that is accessible via the entry aperture;

wherein each of the right dowel connectors and the left dowel connectors is a snap-in dowel;

wherein the snap-in dowel is configured to be inserted through the entry aperture, such that the snap-in dowel reaches into the insert interior of the snap-in insert, such that the snap-in dowel is locked firmly in place inside the insert interior;

whereby the right cabinet side and the left cabinet side each are securely attachable to the full access frame;

wherein a bottom of the insert interior further comprises a bottom elongated guide protrusion, which is configured to adjust a position of the snap-in dowel and ensure that the snap-in dowel is moveable into the insert interior with minimal friction.

\* \* \* \* \*